United States Patent
Ni et al.

(10) Patent No.: US 12,322,225 B2
(45) Date of Patent: Jun. 3, 2025

(54) AIRCRAFT MAINTENANCE OF LINE REPLACEABLE UNITS

(71) Applicant: The Boeing Company, Chicago, IL (US)

(72) Inventors: Kang-Yu Ni, Calabasas, CA (US); Tsai-Ching Lu, Thousand Oaks, CA (US); Alexander Norman Waagen, Sunnyvale, CA (US); Aruna Rani Jammalamadaka, Camarillo, CA (US); Charles Eugene Martin, Santa Monica, CA (US); Alice Ann Murphy, Mesa, AZ (US); Derek Samuel Fok, Mesa, AZ (US); Kirby Joe Keller, Chesterfield, MO (US); Douglas Peter Knapp, West Chester, PA (US)

(73) Assignee: The Boeing Company, Chicago, IL (US)

( * ) Notice: Subject to any disclaimer, the term of this patent is extended or adjusted under 35 U.S.C. 154(b) by 685 days.

(21) Appl. No.: 17/654,199

(22) Filed: Mar. 9, 2022

(65) Prior Publication Data

US 2022/0398550 A1    Dec. 15, 2022

Related U.S. Application Data

(60) Provisional application No. 63/202,441, filed on Jun. 11, 2021.

(51) Int. Cl.
*G06Q 10/00*  (2023.01)
*G05B 23/02*  (2006.01)
(Continued)

(52) U.S. Cl.
CPC ....... *G07C 5/0816* (2013.01); *G05B 23/0283* (2013.01); *G06Q 10/20* (2013.01); *G07C 5/006* (2013.01)

(58) Field of Classification Search
CPC ............ G05B 23/0221; G05B 23/0229; G05B 23/0235; G05B 23/024; G05B 23/0254;
(Continued)

(56) References Cited

U.S. PATENT DOCUMENTS

2019/0187679 A1* 6/2019 Strudwicke ........ G05B 23/0272
2020/0210538 A1* 7/2020 Wang ..................... F03D 17/00
(Continued)

OTHER PUBLICATIONS

Cox, "Regression Models and Life-Tables," Journal of the Royal Statistical Society. Series B (Methodological), vol. 34, No. 2. (1972), pp. 187-220.
(Continued)

*Primary Examiner* — Peter D Nolan
*Assistant Examiner* — Ce Li Li
(74) *Attorney, Agent, or Firm* — Yee & Associates, P.C.

(57) ABSTRACT

A method, apparatus, system, and computer program product for managing a platform. Sensor information for a platform health of the platform is received from a sensor system for the platform. The sensor information for the platform health of the platform is sent by a computer system into a machine learning model trained using historical sensor information indicating a historical platform health and historical context information corresponding to the historical sensor information in which the historical context information is for a set of operating conditions. A remaining useful life of a component in the platform is received by the computer system from the machine learning model.

28 Claims, 13 Drawing Sheets

(51) Int. Cl.
  *G06Q 10/20* (2023.01)
  *G07C 5/00* (2006.01)
  *G07C 5/08* (2006.01)

(58) Field of Classification Search
  CPC ............ G05B 23/0275; G05B 23/0281; G05B 23/0283; G06N 3/08; G06N 20/00; G06Q 10/20; G07C 5/006; G07C 5/008; G07C 5/0808; G07C 5/0816
  See application file for complete search history.

(56) References Cited

U.S. PATENT DOCUMENTS

| | | | |
|---|---|---|---|
| 2022/0100187 A1* | 3/2022 | Isik | G06N 3/08 |
| 2022/0139117 A1* | 5/2022 | Zhang | G06N 3/08 701/29.4 |
| 2022/0283576 A1* | 9/2022 | Cheng | G05B 23/0254 |

OTHER PUBLICATIONS

Fisher et al., "Time-Dependent Covariates in the Cox Proportional-Hazards Regression Model," Annual Review of Public Health, 1999, 20, 14 pages.

Wang et al., "Machine Learning for Survival Analysis: A Survey," ACM Computing Surveys, vol. 51, No. 6, Article 110. Publication date: Feb. 2019, 36 pages.

Daigle et al., "Model-Based Prognostics With Concurrent Damage Progression Processes," IEEE Transactions on Systems, Man, and Cybernetics: Systems, vol. 43, No. 3, May 2013, 12 pages.

Li et al., "A Multi-Task Learning Formulation for Survival Analysis," Proceedings of the 22nd ACM SIGKDD International Conference on Knowledge Discovery and Data Mining, 2016, pp. 1715-1724.

"Aeronautical Design Standards: Handbook for Condition Based Maintenance System for US Army Aircraft," Feb. 8, 2016, 280 pages. https://www.avmc.army.mil/Portals/51/Documents/TechData%20PDF/ADS-79E-8Feb2016.pdf.

Carr, D., "AH-64D Conditioned Based Maintenance (CBM) Component Inspection and Maintenance Manual Using the Modernized Signal Processor Unit (MSPU)," Aviation Engineering Directorate Apache Systems, Jul. 1, 2012, 38 pages.

* cited by examiner

| SENSOR DATA VARIABLE | OPERATING CONDITION |
|---|---|
| ALTITUDE | GROUND |
| | FLIGHT |
| AIR SPEED | HIGH AIR SPEED |
| | LOW AIR SPEED |
| ENGINE TORQUE | HIGH ENGINE TORQUE |
| | LOW ENGINE TORQUE |
| VERTICAL VELOCITY | HIGH VERTICAL VELOCITY |
| | LOW VERTICAL VELOCITY |

FIG. 6

AIRCRAFT MAINTENANCE OF LINE REPLACEABLE UNITS

CROSS-REFERENCE TO RELATED APPLICATION

This application claims the benefit of U.S. Provisional Patent Application Ser. No. 63/202,441, filed Jun. 11, 2021 and entitled "Aircraft Maintenance of Line Replaceable Units;" which is incorporated herein by reference in its entirety.

BACKGROUND INFORMATION

1. Field

The present disclosure relates generally to an improved aircraft management system and in particular, to aircraft maintenance of line replaceable units in aircrafts.

2. Background

Aircraft maintenance involves performing various operations on an aircraft to ensure continued desired operation of the aircraft or aircraft component. The operations can include inspection, replacement, reworking inconsistencies in components, or other operations that maintain compliance with airworthiness directives and maintenance standards.

Aircraft maintenance is often performed on a scheduled basis. In some cases, unscheduled aircraft maintenance can occur when a particular component no longer performs as desired. Unscheduled aircraft maintenance can be challenging depending on deployment location of an aircraft and the availability of spare components in different operational regions. Current maintenance systems rely on reactionary maintenance schedules for unscheduled maintenance. For example, aircrafts such as rotorcraft may be essentially grounded while replacement components and repairs are requested, ordered, and then delivered to the location of the rotorcraft. This type of maintenance can increase the time that aircraft is out of service.

Therefore, it would be desirable to have a method and apparatus that take into account at least some of the issues discussed above, as well as other possible issues. For example, it would be desirable to have a method and apparatus that overcome a technical problem with scheduling aircraft maintenance.

SUMMARY

An embodiment of the present disclosure provides a method for managing a platform. Sensor information for a platform health of the platform is received from a sensor system for the platform. The sensor information for the platform health of the platform is sent by a computer system into a machine learning model trained using historical sensor information indicating a historical platform health and historical context information corresponding to the historical sensor information in which the historical context information is for a set of operating conditions. A remaining useful life of a component in the platform is received by the computer system from the machine learning model.

Another embodiment of the present disclosure provides a method for managing a platform. An observation matrix indicating a time to failure to meet a desired level of performance for instances of a component type is created by a computer system. A feature matrix for a set of metrics that measure a platform health from sensor information indicating the platform health for the component type of the component is created by the computer systems. The sensor information corresponds to the time to failure to meet a desired level of performance for instances of the component type. A set of context profiles for a set of operating conditions that is a context for the set of metrics that measures the platform health is created by the computer system. A machine learning model is trained by the computer system to solve an optimization problem using the observation matrix, the feature matrix, and the set of context profiles.

Still another embodiment of the present disclosure provides a platform management system comprising a computer system and a platform manager in the computer system. The platform manager operates to receive sensor information for a platform health of the platform; send the sensor information for the platform health of the platform into a machine learning model trained using historical sensor information indicating a historical platform health and historical context information corresponding to the historical sensor information in which the historical context information is for a set of operating conditions; and receive a remaining useful life of a component in the platform from the machine learning model.

In another embodiment of the present disclosure, a platform management system comprises a computer system and a platform manager in the computer system. The platform manager operates to create an observation matrix indicating a time to failure to meet a desired level of performance for instances of a component type for a component in the platform; create a feature matrix for a set of metrics that measure a platform health from historical sensor information indicating the platform health for the component type of the component, wherein the historical sensor information corresponds to the time to failure to meet the desired level of performance for instances of the component type; create a set of context profiles for operating conditions that are a context for the set of metrics that measures the platform health; and train a machine learning model to solve an optimization problem using the observation matrix, the feature matrix, and the set of context profiles Another embodiment of the present invention provides A computer program product for managing a platform, the computer program product comprises a computer-readable storage media with first program code, second program code, and third program code stored on the computer readable media. The first program code is executable by a computer system to cause the computer system to receive, from a sensor system for the platform, sensor information for a platform health of the platform. The second program code is executable by the computer system to cause the computer system to send the sensor information for the platform health of the platform into a machine learning model trained using historical sensor information indicating historical platform health and historical context information corresponding to the historical sensor information in which the historical context information is for a set of operating conditions. The third program code is executable by the computer system to cause the computer system to receive a remaining useful life of a component in the platform from the machine learning model.

Yet another embodiment of the present invention provides A computer program product for managing a platform, the computer program product comprising computer-readable storage media with first program code, second program code, third program code, and fourth program code stored on the computer readable media. The first program code is executable by a computer system to cause the computer system to create an observation matrix indicating a time to failure to meet a desired level of performance for instances of a component type for a component in the platform. The second program code is executable by a computer system to cause the computer system to create a feature matrix for instances of a set of metrics from historical sensor information indicating a platform health for the component type of the component. The historical sensor information corresponds to the time to failure to meet the desired level of performance for instances of the component type. The third program code is executable computer system to cause the computer system to create a set of context profiles for a set of operating conditions that is a context for the set of metrics that indicate the platform health. The fourth program code is executable by a computer system to cause the computer system to train a machine learning model to solve an optimization problem using the observation matrix, the feature matrix, and the set of context profiles.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a table of sensor information mapped to operating conditions in accordance with an illustrative embodiment;

DETAILED DESCRIPTION

Figure 1:
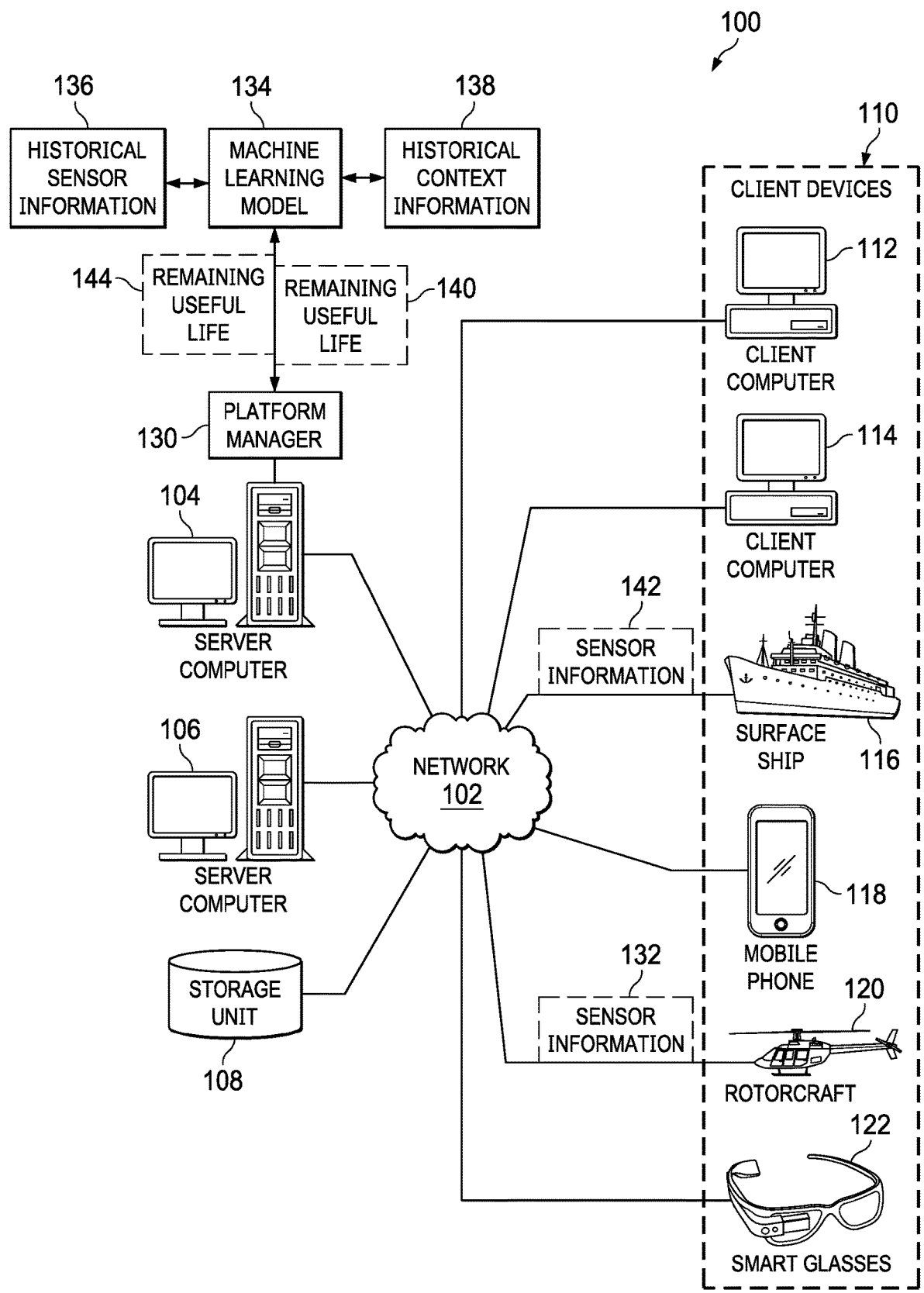
FIG. 1 is a pictorial representation of a network of data processing systems in which illustrative embodiments can be implemented.

The illustrative embodiments recognize and take into account one or more different considerations. For example, the illustrative embodiments recognize and take into account that maintenance for aircraft or other platforms can be easier to manage having knowledge of impending changes in part performance that result in undesired aircraft performance. For example, the illustrative embodiments recognize and take into account that the undesired aircraft performance may be, for example, reduction in fuel efficiency, flight envelopes, maximum altitude, or aircraft speed.

The illustrative embodiments recognize and take into account that accurately knowing the remaining useful life (RUL) of the components enables procuring parts ahead of time and enables the allocation of resources for service and repair. The illustrative embodiments recognize and take account that this knowledge can be especially useful when the availability of spare components may be difficult to obtain in different regions of the world.

For example, the illustrative embodiments recognize and take into account that the remaining useful life of components such as line replaceable units (LRUs) can change based on use and environmental conditions. The illustrative embodiments recognize and take into account that knowing when the remaining useful life the component will result in an impending the replacement can provide increased lead times for allocating resources such as personnel, replacement components, or both personnel and replacement components. Thus, illustrative embodiments recognize and take into account that accurately knowing the remaining useful life can result in reducing the resource burden for maintaining aircraft.

The illustrative embodiments recognize and take account that machine learning models can be used to more accurately predict remaining useful life. The illustrative embodiments recognize and take account that remaining useful life prediction can be challenging because of high dimensional feature space for the data that can be collected for aircraft. The illustrative embodiments recognize and take account that this type of prediction using current techniques can be made more difficult through a small number of aircraft, nonuniform data samples, potentially hidden variables, changing aircraft states, and a lack of physics models describing underlying system dynamics.

The illustrative embodiments recognize and take into account that using context information in addition to other information used to predict remaining useful life can provide improved accuracy in remaining useful life prediction. Thus, the illustrative embodiments can provide a method, apparatus, system, computer program product that predicts remaining useful life using a machine learning model be trained context information.

In one illustrative example, a method is shown for managing a platform. Sensor information for a platform health of the platform is received from a sensor system for the platform. The sensor information for the platform health of the platform can be sent into a machine learning model trained using historical sensor information indicating historical platform health and historical context information corresponding to the historical sensor information in which the historical context information is for a set of operating conditions. An output can be received from the machine learning model in which the output indicates a remaining useful life of a component in the platform. In the illustrative example, the context information for the platform can also be sent to machine learning model.

As used herein, a "set of" when used with items means one or more items. For example, a set of operating conditions is one or more operating conditions.

With reference now to the figures and, in particular, with reference to FIG. 1, a pictorial representation of a network of data processing systems is depicted in which illustrative embodiments can be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112 and client computer 114. Client devices 110 can be, for example, computers, workstations, or network computers. In the depicted example, server computer 104 provides information, such as boot files, operating system images, and applications to client devices 110.

Further, client devices 110 can also include other types of client devices such as surface ship 116, mobile phone 118, rotorcraft 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, management of maintenance for client devices such as surface ship 116 and rotorcraft 120 can be performed using machine learning models. As depicted, the management of maintenance for these clients can be performed by platform manager 130. The management of maintenance can include at least one of identifying needed maintenance, scheduling maintenance, ordering components, coordinating resource allocation, or other operations performed to manage maintenance for at least one of surface ship 116 or rotorcraft 120.

In this illustrative example, platform manager 130 receives sensor information 132 for rotorcraft 120. In illustrative example, sensor information 132 can indicate platform health for rotorcraft 120. Sensor information 132 can include context information or rotorcraft 120 that corresponds sensor information 132 that indicates platform health for rotorcraft 120.

Platform manager 130 determines a remaining useful life 140 for a set of components in rotorcraft 120 using sensor information 132 and machine learning model 134. As used herein, a set of when used with reference items means one or more items. For example, a set of components in rotorcraft 120 is one or more components in rotorcraft 120.

In this illustrative example, machine learning model 134 has been trained using historical sensor information 136 indicating historical platform health and historical context information 138. In this illustrative example, historical context information 138 corresponds to historical sensor information 136 in time and origin. In other words, historical context information 138 is from the same time and for the same platform as historical sensor information 136.

With sensor information 132, machine learning model 134 can output remaining useful life 140 for a set of components in rotorcraft 120. Remaining useful life 140 can be used by platform manager 130 to perform one or more different actions. For example, platform manager 130 can schedule maintenance for rotorcraft 120.

As another example, surface ship 116 can also send sensor information 142 to platform manager 130. Sensor information 142 can be sent to machine learning model 134 which returns remaining useful life 144 for the components in surface ship 116. Sensor information 142 can indicate platform health for surface ship 116. Sensor information 142 can also include context information for rotorcraft 120 that corresponds sensor information 142 that indicates platform health for surface ship 116.

Although the illustrative example in FIG. 1 describes the management of client devices 110 such as surface ship 116 and rotorcraft 120, other types of client devices 110 can also be managed. For example, client devices 110 can also include a spacecraft, a building, or other suitable types of platforms for which maintenance can be managed. In the illustrative examples, this maintenance can also be extended to platforms in the form of data processing systems such as client computer 112, client computer 114, and smart glasses 122.

Figure 2:
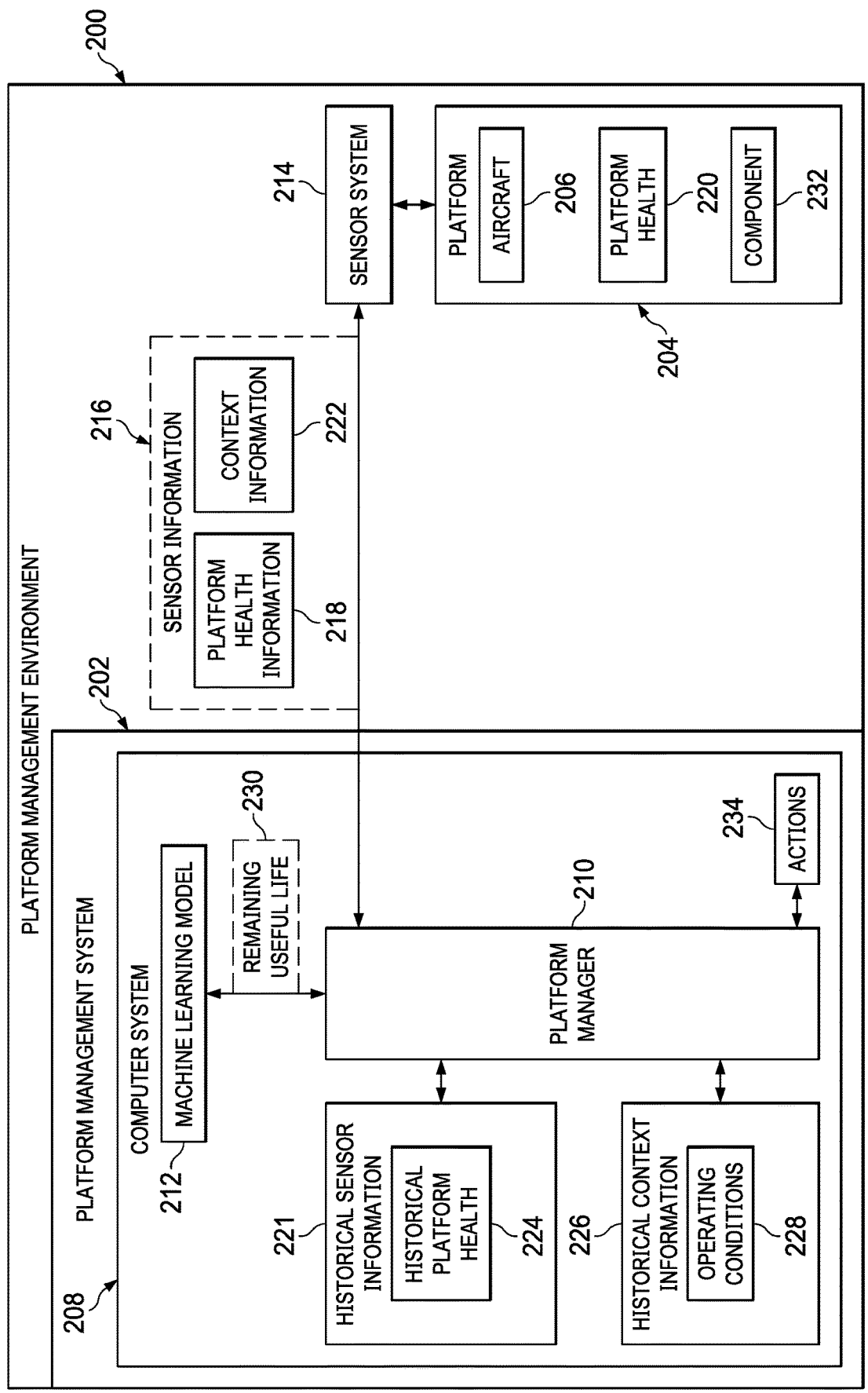
FIG. 2 an illustration of a block diagram of a platform maintenance environment in accordance with an illustrative embodiment.

With reference now to FIG. 2, an illustration a block diagram of a platform maintenance environment is depicted in accordance with an illustrative embodiment. In this illustrative example, platform maintenance environment 200 includes components that can be implemented in hardware such as the hardware shown in network data processing system 100 in FIG. 1.

As depicted, platform management system 202 can manage platform 204. This management can include, for example, managing the maintenance for platform 204. In this illustrative example, platform 204 take the form of aircraft 206. Platform 204 can take a number of different forms in addition to aircraft 206. For example, platform 204 can be selected from a group comprising a mobile platform, a stationary platform, a land-based structure, an aquatic-based structure, a space-based structure, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, a building, and other types of platforms.

In this illustrative example, platform management system 202 is comprised of a number of different components. As depicted, platform management system 202 comprises computer system 208 and platform manager 210. Platform manager 210 is located in computer system 208.

Platform manager 210 can be implemented in software, hardware, firmware, or a combination thereof. When software is used, the operations performed by platform manager 210 can be implemented in program code configured to run on hardware, such as a processor unit. When firmware is used, the operations performed by platform manager 210 can be implemented in program code and data and stored in persistent memory to run on a processor unit. When hardware is employed, the hardware can include circuits that operate to perform the operations in platform manager 210.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 208 is a physical hardware system and includes one or more data processing systems. When more than one data processing system is present in computer system 208, those data processing systems are in communication with each other using a communications medium. The communications medium can be a network. The data processing systems can be selected from at least one of a computer, a server computer, a tablet computer, or some other suitable data processing system.

As depicted, platform management system 202 can manage maintenance for platform 204 using machine learning model 212. In this illustrative example, machine learning model 212 trained using historical sensor information 221 indicating historical platform health 224 and historical context information 226 corresponding to historical sensor information 221. In this depicted example, historical context information 226 is for a set of operating conditions 228. In other words, the set of operating conditions 228 can be determined using historical context information 226. In the illustrative example, historical platform health 224 and historical context information 226 is different types of data.

The set of operating conditions 228 identified from historical context information 226 can provide context for historical sensor information 221. Historical sensor information 221 is information about historical platform health 224 for one or more platforms. Historical sensor for historical sensor information 221 can include at least one of a temperature, a pressure, a vibration level, a fault indicator, a low-pressure indicator, or other suitable sensor information.

The set of operating conditions 228 identified using historical context information 226 can be selected from at least one of an operational condition, a state of a platform, an environment for the platform, or some other information that provides context to historical sensor information 221 for historical platform health 224. For example, an operational condition can be in-flight, on ground, high altitude, cruising altitude, takeoff, ascent, descent, landing, turning, high speed, low speed, or other types of conditions relating to the operation of a platform. These operational conditions can give context to the information in historical sensor information 221 for historical platform health 224.

In managing maintenance for platform 204, platform manager 210 can receive such sensor information 216 from sensor system 214. In this illustrative example, sensor system 214 for platform 204 can generate sensor information 216 from monitoring platform 204. Monitoring can include detecting events or changes in the environment for platform 204. The changes in environment can be the environment around platform 204, within platform 204, or both around and within platform 204.

Sensor system 214 is a hardware system and can include software. Sensors and other components in sensor system 214 can be located in platform 204, exterior to platform 204, or a combination thereof.

The sensors in sensor system 214 can include at least one of an airflow meter, a speed sensor, a voltage detector, accelerometer, an altimeter, a gyroscope, an inertial navigation system, an inertial reference unit, a yaw rate sensor, an incremental encoder, a linear encoder, a position sensor, a tilt sensor, a pitot tube, an angle of attack (AOA) sensor, a fuel sensor, or other suitable types of sensors that can be used to generate sensor information 216. The other components in sensor system 214 can include processor units, computers, or other data processing devices that can signals and generate sensor information 216.

As depicted, sensor information 216 from sensor system 214 for platform 204 received by platform manager 210 can include a number of different types of information. For example, sensor information 216 can include platform health information 218 and context information 222.

Platform health information 218 in sensor information 216 can be for platform health 220 of platform 204. Platform health information 218 can be any information that indicates platform health 220 for platform 204 or can be used to determine platform health 220 for platform 204. This type of sensor information can be received directly from sensors or indirectly from data processing components in sensor system 214.

For example, data processing components such as modernized signal processing units (MSPUs) in sensor system 214 can provide this type of information. Modernized signal processor units (MPSUs) can be located in sensor system 214 in platform 204, or other locations. These modernized signal processing units (MSPUs) are considered "modernized" in the context of platforms such as currently available rotorcraft.

As another example, context information 222 can be from other sources in such as a mission data recorder (MDR), which can be located in sensor system 214, platform 204, or some other suitable location. In the illustrative example, platform health information 218 and context information 222 are from different features spaces for sensor information 216.

In this illustrative example, platform manager sends platform health information 218 in sensor information 216 for platform health 220 of platform 204 into machine learning model 212. In response, platform manager 210 receives remaining useful life 230 of component 232 in platform 204 from machine learning model 212. Component 232 can take a number of different forms. In this illustrative example, component 232 can be a single part, assembly, a system, or some other grouping of parts. For example, the component can be drivetrain, a rotor tail, an engine, an antenna, a fan unit, a brake system, or some other type of component that can be in platform 204.

In this illustrative example, platform manager 210 can perform a set of actions 234 with respect to platform 204 in response to receiving remaining useful life 230 of component 232 in platform 204. The set of actions 234 can be is selected from at least one of indicating a maintenance is needed, scheduling the maintenance, aborting a current mission for the platform, activating a backup component to replace the component, performing the maintenance, or some other suitable action.

As depicted, platform manager 210 can also send context information 222 in sensor information 216 into machine learning model 212 along with platform health information 218. In this example, context information 222 is additional information that can be used to provide context for platform health information 218 in sensor information 216. Context information 222 corresponds to platform health information 218.

In this illustrative example, the correspondence between these two types of information is in time. For example, for example, the time for context information 222 corresponds to the time for platform health information 218. For example, context information 222 can be from the same time period as platform health information 218. In other words, these two types of information can be generated sensors detecting events for changes in environment within the same time period.

With platform manager 210 sending both platform health information 218 for platform health 220 platform 204 and context information 222 to machine learning model 212, machine learning model 212 can return remaining useful life 230 with increased accuracy as compared to platform manager 210 sending platform health information 218 without context information 222 to machine learning model 212.

Figure 3:
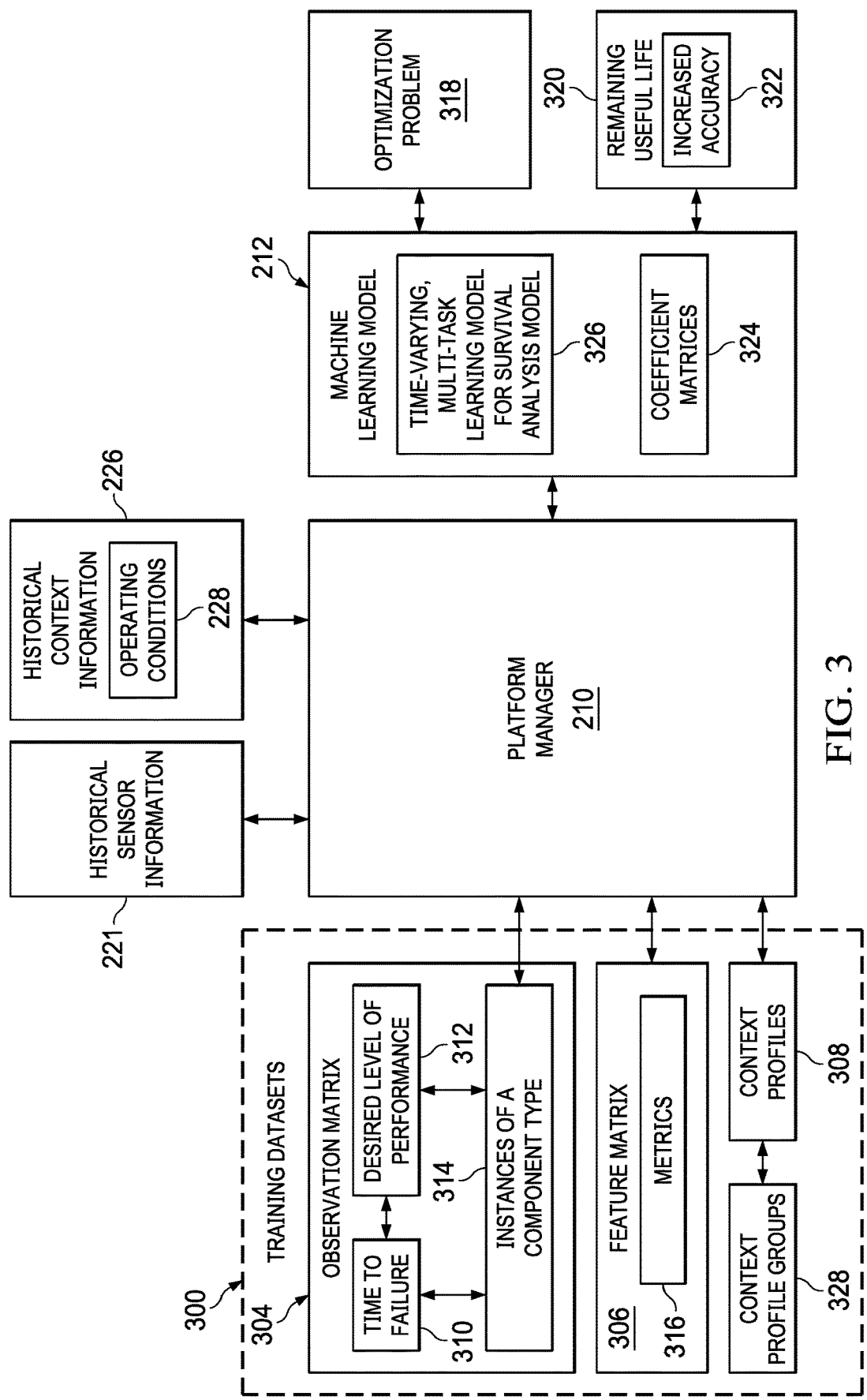
FIG. 3 is an illustration of a block diagram of data flow for training machine learning model in accordance with an illustrative embodiment.

Turning next to FIG. 3, an illustration of a block diagram of data flow for training machine learning model is depicted in accordance with an illustrative embodiment. As depicted, platform manager 210 trains machine learning model 212 using historical sensor information 221 and historical context information 226 corresponding historical sensor information 221 in which historical context information 226 is for the set of operating conditions 228.

In this illustrative example, platform manager 210 generates training data sets 300 for use in training machine learning model 212 to predict remaining useful life 320. As depicted, training data sets 300 comprises of observation matrix 304, feature matrix 306, and a set of context profiles 308.

As depicted in this example, platform manager 210 creates observation matrix 304. Observation matrix 304 indicates time to failure 310 to meet desired level of performance 312 for instances of a component type 314. In this illustrative example, time to failure 310 to meet desired level of performance 312 is the time that passes before a particular component type no longer meets desired level of performance 312.

Desired level of performance 312 can take a number of different forms. For example, desired level of performance 312 can be whether a component is at least one of operational, operates at a selected fuel efficiency level, operates at a speed threshold, has a temperature within a temperature range, under a pressure level, sends signals within a selected voltage range, or other types of performance.

The selection of particular types of performance and values for the selected types of performance can be based on various sources. These sources can be, for example, selected from at least one of an industry-standard, a government regulation, a manufacturer standard, a statute, or other suitable sources.

As depicted, platform manager 210 also creates feature matrix 306 for a set of metrics 316 from historical sensor information 221 indicating a platform health for the instances of a component type 314. Historical sensor information 221 corresponds to the time to failure 310 to meet desired level of performance 312 for instances of a component type 314.

The set of metrics 316 can take a number of different forms. For example, the set metrics 316 can be selected from at least one of a condition indicator, sensor data, raw sensor data, processed sensor data, or other types of data that can be used to determine platform health.

In the illustrative example, a condition indicator is a feature whose behavior changes in a predictable way for a system such as a component or multiple components deteriorate or operate in different operational modes. The condition indicator can be used to distinguish abnormal operations from normal operations and can be used to predict remaining useful life of a set of components. In this illustrative example, condition indicators can be obtained from processing sensor data and can be selected to indicate the presence of abnormal conditions for components that may lead to a degradation in performance.

A condition indicator can be, for example, a measure of torsional vibrations in a driveshaft in a drivetrain in pulses per revolution. Another condition indicator can be accelerometer readings in inches per second for a hanger bearing in the drive train. In yet another example, a condition indicator can be accelerometer readings for a driveshaft in a drivetrain. These different types of readings can be used to indicate the health of a component such as a drivetrain.

In this example, platform manager 210 creates a set of context profiles 308 using historical context information 226 collected for a set of platforms that corresponds to historical sensor information 221 from the same set of platforms. In this illustrative example, historical context information 226 corresponds in time to historical sensor information 221. In other words, these two types of information can be generated from at least one of events or environments detected for the different platforms during the same period of time.

Historical context information 226 can be, for example, at least one of an operational condition, a state of a platform, an environment for platform, or some other type of condition that can provide context for historical sensor information 221. The environment for the platform can be the environment that is in the platform, outside of the platform, or both in the platform and outside of the platform.

In this illustrative example, a context profile in the set of context profiles 308 can be a representation of a distribution of data. For example, a context profile can be in the form of as a histogram with bins. In this example, each bin represents a combination of the set of operating conditions 228.

For example, platform manager 210 can creates a set of context profiles 308 for the set of operating conditions 228 that corresponds to the set of metrics 316 that measure platform health 220 in feature matrix 306. In this illustrative example, the set of operating conditions 228 can be determined from historical context information 226.

In this illustrative example, historical context information 226 is information that is different from historical sensor information 221 used to determine metrics 316. Historical context information 226 comprises information from sensor system 214 or other sources that provide a context for metrics 316 determined from historical sensor information 221.

Platform manager 210 can train machine learning model 212 to solve optimization problem 318 using observation matrix 304, feature matrix 306, and the set of context profiles 308. By solving optimization problem 318, machine learning model 212 can determine remaining useful life 320 with increased accuracy 322. This determination can be a prediction of remaining useful life 320 and can include an indication of the accuracy of the prediction.

In solving optimization problem 318, machine learning model 212 can be modified to create a set of coefficient matrices 324. The set of coefficient matrices 324 is used by machine learning model 212 to predict remaining useful life 320.

By using an additional data set, context profiles 308, in addition to feature matrix 306 and observation matrix 304, the prediction of remaining useful life 320 can be improved as compared to predictions made without use context profiles 308 in training data sets 300. As a result, machine learning model 212 can provide increased accuracy 322 in managing platforms. For example, platform manager 210 can schedule maintenance for platforms with at least one of reduced platform unavailability, reduced expense, or other benefits.

In this illustrative example, when the set of context profiles 308 comprises more than one context profile, each context profile in the set of context profiles 308 can result in the creation of a coefficient matrix in the set of coefficient matrices 324.

Further, context profiles 308 can be grouped to form context profile groups 328 such that such that context profiles having sufficiently similar operating conditions can be part of the same group. For example, a context profile group in context profile groups 328 in context profiles 308 that include an operating condition of an aircraft on the ground. Another context profile group in context profile groups 328 can be context profiles 308 that have been an operating condition of high-speed for aircraft. These and other types of groupings can be used.

With a set of context profile groups 328, these groups can be sent to machine learning model 212 as part of training data sets 300. A context profile group can be one or more of context profiles 308. Each context profile group in context profile groups 328 can result in a coefficient matrix in set of coefficient matrices 324.

In this illustrative example, machine learning model 212 can take a number of different forms. For example, machine learning model can be selected from one of a multi-task machine learning model, a multi-task learning model for survival analysis, a time-varying multi-task learning model for survival analysis, an artificial neural network, a cognitive system, a Bayesian network, a fuzzy logic system, and other suitable types of machine learning models.

The training can be performed using various types of machine learning algorithms. These machine learning algorithms can include at least one of a supervised learning, and unsupervised learning, a feature learning, a sparse dictionary learning, and anomaly detection, association rules, or other types of learning algorithms. The learning one illustrative example is a context-aware time-varying multi-task learning for survival analysis. In this illustrative example, machine learning model 212 takes the form of time varying multitask learning model for survival analysis (TV-MTLSA) 326. Time varying multitask learning model for survival analysis can be a multitask machine learning model for survival analysis in which the analysis performed is adaptable to time varying states of features in the data.

In this illustrative example, historical sensor information 221 using feature matrix 306 can have different timescales for times as compared to the times for historical context information 226 using context profiles 308. In the illustrative example, timescales and time points of historical context information 226 can be very different and not necessarily align to the times for metrics 316 derived from historical sensor information 221. In this illustrative example, historical context information 226 can be selected for the same time as historical sensor information 221 used to create feature matrix 306. In this manner, the time periods for context profiles 308 can correspond in time to feature matrix 306.

In this illustrative example, optimization problem 318 can be as follows:

$$\text{Solve } B \text{ by:} \min_{XB \in P} \frac{1}{2}\|Y - XB\|_F^2 + \frac{\lambda_1}{2}\|B\|_F^2 + \lambda_2\|B\|_{2,1}$$

wherein B is a coefficient matrix, Y is the observation matrix, X is the feature matrix, $\lambda_1 > 0$ is a parameter that tunes the importance of the second term, $\lambda_2 > 0$ is a parameter that tunes the importance of the third term, $P = \{Y \geq 0, Y_{ij} \geq Y_{il} | j \leq l, \forall j=1, \ldots, k, \forall l=1, \ldots, k\}$ is the space of non-negative non-increasing list structure that the observation matrix follows and F is the Frobenius norm, which is defined as $\|M\|_F = \sqrt{\Sigma_{i=1}^n \Sigma_{j=1}^m M_{ij}^2}$ and the $l_{2,1}$-norm is defined as $\|M\|_{2,1} = \Sigma_{i=i}^n \sqrt{\Sigma_{j=1}^m M_{ij}^2}$.

With respect to the identification of this optimization problem in survival analysis, in survival analysis, the goal is to estimate the time to the event of interest (e.g., survival time) for a new instance, given its features. This estimation can be performed with regression analysis on the known data, a collection of instances with their features and event indicators (e.g., survival time).

The Cox model and its extensions are built based on the proportional hazards hypothesis, i.e., it assumes that the hazard ratio between two instances is constant in time. To predict the survival time, a baseline hazard function has to be estimated separately and this estimation can induce more prediction errors. The parametric regression models can suffer from even more critical weaknesses. In other words, the prediction performance can be highly dependent on the choice of the distribution. In the illustrative example, a multi-task learning formulation for survival analysis (MTLSA) method translates the regression problem into a series of related binary classification problems.

In the illustrative examples, the given data consists of n instances, where the survival time and an 1×q feature vector $X_i$ are known for each instance i. The observation matrix is formulated as an n×t matrix Y, where each row represents an instance and each column represents a time point. The entry $Y_{ij}$ represents the status of instance i at time point j and is set to be "1" if alive and "0" if fail. The observation matrix follows a non-negative non-increasing list structure, and the space of such list structure is defined as $P = \{Y \geq 0, Y_{ij} \geq Y_{il} | j \leq l, \forall j=1, \ldots, k, \forall l=1, \ldots, k\}$.

The n×q feature matrix X is constructed from the feature vectors where the $i^{th}$ row is the feature vector $X_i$ of instance i. The problem setup is to find a shared representation with an q×t sparse coefficient matrix B by solving the following optimization problem:

$$\min_{XB \in P} \|Y - XB\|_F^2 + \frac{\lambda_1}{2}\|B\|_F^2 + \lambda_2\|B\|_{2,1}$$

where
$\lambda_1$ and $\lambda_2$ are parameters to tune the importance of each term. The Frobenius norm is defined as $\|M\|_F = \sqrt{\Sigma_{i=1}^n \Sigma_{j=1}^m M_{ij}^2}$ and the $l_{2,1}$-norm is defined as $\|M\|_{2,1} = \Sigma_{i=i}^n \sqrt{\Sigma_{j=1}^m M_{ij}^2}$. Among the three terms in the optimization problem, the first term $\|Y - XB\|_F^2$ finds a shared representation with a coefficient matrix B, the second term $$\frac{\lambda_1}{2}\|B\|_F^2$$

prevents overfitting, and the third term $\lambda_2\|B\|_{2,1}$ ensures sparseness of the coefficient matrix and selects common features.

In the illustrative example, time varying multitask learning model for survival analysis (TV-MTLSA) 326 extends multitask learning model for survival analysis (MTLSA) model to handle time-varying feature vectors, where the feature matrix becomes time-varying X(t). Each instance is split into multiple rows with different starting times to construct the status and feature matrices, denoted by $\hat{Y}$ and $\hat{X}$, respectively. Time varying multitask learning model for survival analysis 326 solves the following optimization problem:

$$\min_{\hat{X}B \in P} \|\hat{Y} - \hat{X}B\|_F^2 + \frac{\lambda_1}{2}\|B\|_F^2 + \lambda_2\|B\|_{2,1}$$

This process can include operation of training time varying multitask learning model for survival analysis 326, determine the parameters, and obtaining the sparse coefficient matrix B. From input data, a feature matrix $\hat{X}$ can be constructed such that each row corresponds to a failure instance (rather than a tail number as an instance) and each column corresponds to a feature, such as a condition indicator. Next the corresponding observation matrix $\hat{Y}$ that indicates the status of each failure instance can be constructed using the information on flight hours till failure. With parameters for $\lambda_1$ and $\lambda_2$, the optimization problem can be solved.

Thus, the inclusion of a set of context profiles 308 in training data sets 300 to train machine learning model 212 to solve optimization problem 318 can result in improved accuracy in predicting remaining useful life 320. In this illustrative example, an improvement can be made in machine learning model 212 using context profiles 308. For example, set of coefficient matrices 324 can provide for increased accuracy 322 when context profiles 308 are used in training machine learning model 212.

Figure 4:
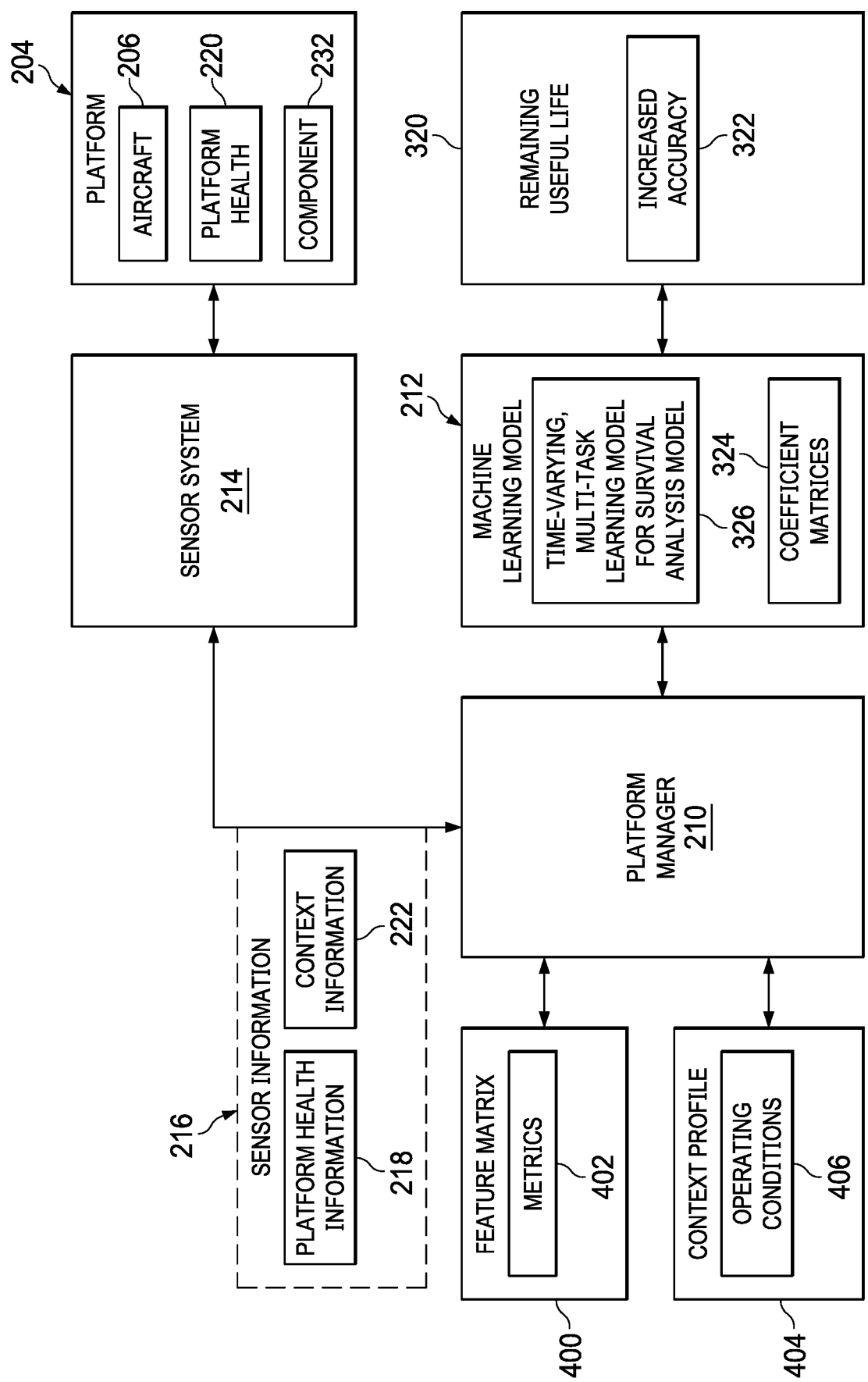
FIG. 4 is an illustration of a block diagram of a dataflow for determining remaining useful life using machine learning model in accordance with an illustrative embodiment.

With reference to FIG. 4, illustration of a block diagram of a dataflow for determining remaining useful life using machine learning model is depicted in accordance with an illustrative embodiment. In this illustrative example, platform manager 210 receives sensor information 216 for platform 204 from sensor system 214 associated with platform 204. As depicted, sensor information 216 comprises platform health information 218 and context information 222.

As depicted, platform manager 210 creates feature matrix 400 using sensor information 216. In this illustrative example, platform manager 210 creates feature matrix 400 from sensor information 216 for platform health 220 of the platform 204. This sensor information is platform health information 218 in this example. Feature matrix 400 comprises values for a set of metrics 402 that measure platform health 330 for platform 204.

In this example, platform manager 210 sends feature matrix 400 into machine learning model 212 trained using historical sensor information 221 indicating historical platform health 224 and historical context information 226 corresponding to historical sensor information 221 in which historical context information 226 is for set of operating conditions 228. In response, machine learning model 212 can return remaining useful life 320 with increased accuracy 322 as compared to machine learning models not trained in accordance with an illustrative example.

In another illustrative example, additional information in addition to feature matrix 400 can be sent to machine learning model 212 to obtain remaining useful life 320. For example, platform manager 210 can also create context profile 404 containing operating conditions 406 from context information 222 in sensor information for platform 204. In this illustrative example, context information 222 used to create context profile 404 that corresponds to platform health information 218 in sensor information 216 used to determine metrics 402.

In the illustrative example, this correspondence can be from the same time. In other words, context information 222 used to create context profile 404 with operating conditions 406 is from the same time period for same times as platform health information 218 used to create feature matrix 400. These times can be an exact time correspondence or within the same ranges of time from which platform health information 218 in context information 222 in sensor information 216 were generated by sensor system 214. The context information can also be within some time. Or time range of when platform health information 218 was generated. The selection of correspondence for time can be based on whether context information 222 provides context for platform health information 218.

As depicted in this additional illustrative example, platform manager 210 sends feature matrix 400 and context profile 404 into machine learning model 212.

In response, machine learning model 212 determines remaining useful life 320. Remaining useful life 320 can have additional accuracy in addition to increased accuracy 322 provided by using feature matrix 400. Context profile 404 can be used by machine learning model 212 to identify coefficients in coefficient matrices 324 for machine learning model 212. In this example, remaining useful life 320 can have increased accuracy 322 over sending feature matrix 400 without context profile 404.

In one illustrative example, one or more technical solutions are present that overcome a technical problem with scheduling aircraft maintenance. As a result, one or more technical solutions can provide a technical effect increasing the accuracy in scheduling maintenance before components fail to operate at a desired level of performance. One or more technical solutions can provide a technical effect increasing accuracy in scheduling through determining remaining useful live with increased accuracy. One or more technical solutions provide increased accuracy in predicting remaining useful life for components in platforms including aircraft even with at least one of the high-dimensional feature space of the sensor data, relatively small number of instances of aircraft, nonuniform data samples, potentially hidden variables, changing aircraft states, or lack of physics models that describes the underlying system dynamics.

Computer system 208 can be configured to perform at least one of the steps, operations, or actions described in the different illustrative examples using software, hardware, firmware, or a combination thereof. As a result, computer system 208 operates as a special purpose computer system in which platform manager 210 in computer system 208 enables increasing accuracy in predicting remaining useful life with machine learning model 212. In particular, machine learning model 212 transforms computer system 208 into a special purpose computer system as compared to currently available general computer systems that do not have machine learning model 212.

In the illustrative example, the use of platform manager 210 with machine learning model 212 in computer system 208 integrates processes into a practical application for managing platforms that increases the performance of computer system 208. In the illustrative example, machine learning model 212 is modified through training using training data sets 300 such that machine learning model 212 can determine a set of coefficient matrices 324 that can be used to provide increased accuracy 322 in the prediction of remaining useful life 320 determined by machine learning model 212.

The illustration of platform maintenance environment 200 in the different components in FIGS. 1-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, platform manager 210 and computer system 208 are shown as block representing separate functional components from platform 204. In some illustrative examples, some or all of computer system 208 may be located in platform 204. As another example, platform manager 210 can be located in platform 204, in can be a remote location, or distributed between platform 204 and a remote location.

As another example, remaining useful life can be returned for one or more components in addition to remaining useful life 230 returned for component 232. In other words, a remaining useful life can be returned for each component. In yet another illustrative example, remaining useful life 230 can be for a group of components rather than for individual components. In this example, a "group of" when used with reference to items means two or more items. For example, a group of components is two or more components.

Figure 5:
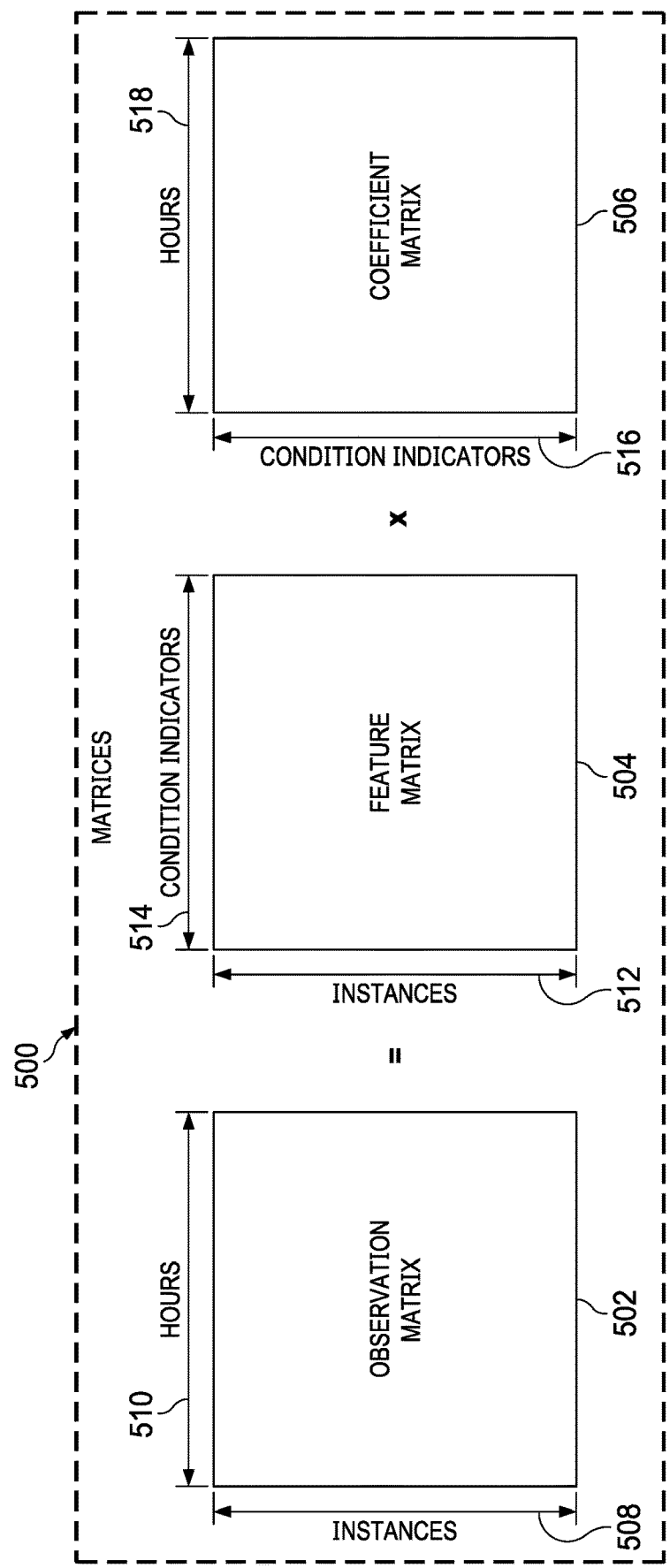
FIG. 5 is an illustration of matrices used in training a machine learning model in accordance with an illustrative embodiment.

With reference now to FIG. 5 is an illustration of matrices used in training a machine learning model is depicted in accordance with an embodiment. In this illustrative example, matrices 500 comprise observation matrix 502, feature matrix 504, coefficient matrix 506.

Observation matrix 502 is an example of observation matrix 304 in FIG. 3 and feature matrix 504 is an example of feature matrix 306 in FIG. 3. In this illustrative example, these two matrices are used by a machine learning model to determine coefficient matrix 506 when the machine learning model solves an optimization problem. Coefficient matrix 506 is an example of a coefficient matrix in coefficient matrices 324 in FIG. 3.

As depicted, observation matrix has rows 508 containing instances data indicating hours before failure of the components. Columns 510 in observation matrix 502 are the hours in which. In this example, the matrix is populated using logic "1s" indicating component is alive and logic "0s" indicating that a component has failed. In this illustrative example, each instance in rows 508 can be for different components of the same type. Additionally, two instances in rows 508 can be for the same identical component at different times.

In this illustrative example, feature matrix 504 has rows 512 of instances and columns 514 of condition indicators. In this illustrative example, each data set in a row in rows 512 is for the same components from the same time for a corresponding row in rows 508 in observation matrix 502.

For example, a first row in rows 508 and observation matrix 502 contains the hours before failure of the components. The first row in rows 512 in feature matrix 504 contains data for condition indicators in columns 514 that are from the same time period for the hours in observation matrix 502.

As depicted, coefficient matrix 504 has rows 516 for condition indicators and columns 518 for hours. This matrix is a matrix that the machine learning model generates when solving for an optimization problem. The coefficient matrix can be generated for each context profile or grouping of context profiles.

Turning to FIG. 6, an illustration of a table of sensor information mapped to operating conditions is depicted in accordance with an illustrative embodiment. Table 600 comprises sensor data variable column 602 and operating condition column 604. Table 600 illustrates examples of sensor information 216 in FIG. 2 in the form of sensor data variables in sensor data variable column 602. Examples of operating conditions that can be determined from sensor information are depicted in operating condition column 604.

For example, altitude 606 is a sensor data variable that can be used to determine operating conditions such as ground 608 and flight 610. As depicted, airspeed 612 can be used to determine whether high air speed 614 or low air speed 616 are present as operating conditions. In illustrative example, engine torque 618 can be used to determine the operating conditions, high engine torque 620 and low engine torque 622. As another example, vertical velocity 624 can be used to determine operating conditions in the form of high vertical velocity 626 and low vertical velocity 628.

Illustration of table 600 is only provided as an example sensor information can be used to determine operating conditions. This illustration is not meant to limit the manner in which other illustrative examples can be implemented. For example, engine torque 618 can be used to three categories of engine torque such as hydrogen torque 620, medium engine torque, and low engine torque 622. In yet other illustrative examples, two or more sensor data variables can be used to determine a particular operating condition.

These and other operating conditions determine from sensor information can be used to context information such as context profiles that can be with historical platform health to train machine learning models to identify remaining useful life for different types of platforms. Use of the context profiles can increase the accuracy in which remaining useful life can be determined as compared to machine learning models that do not take that type of information into account during training.

Figures 7, 8:
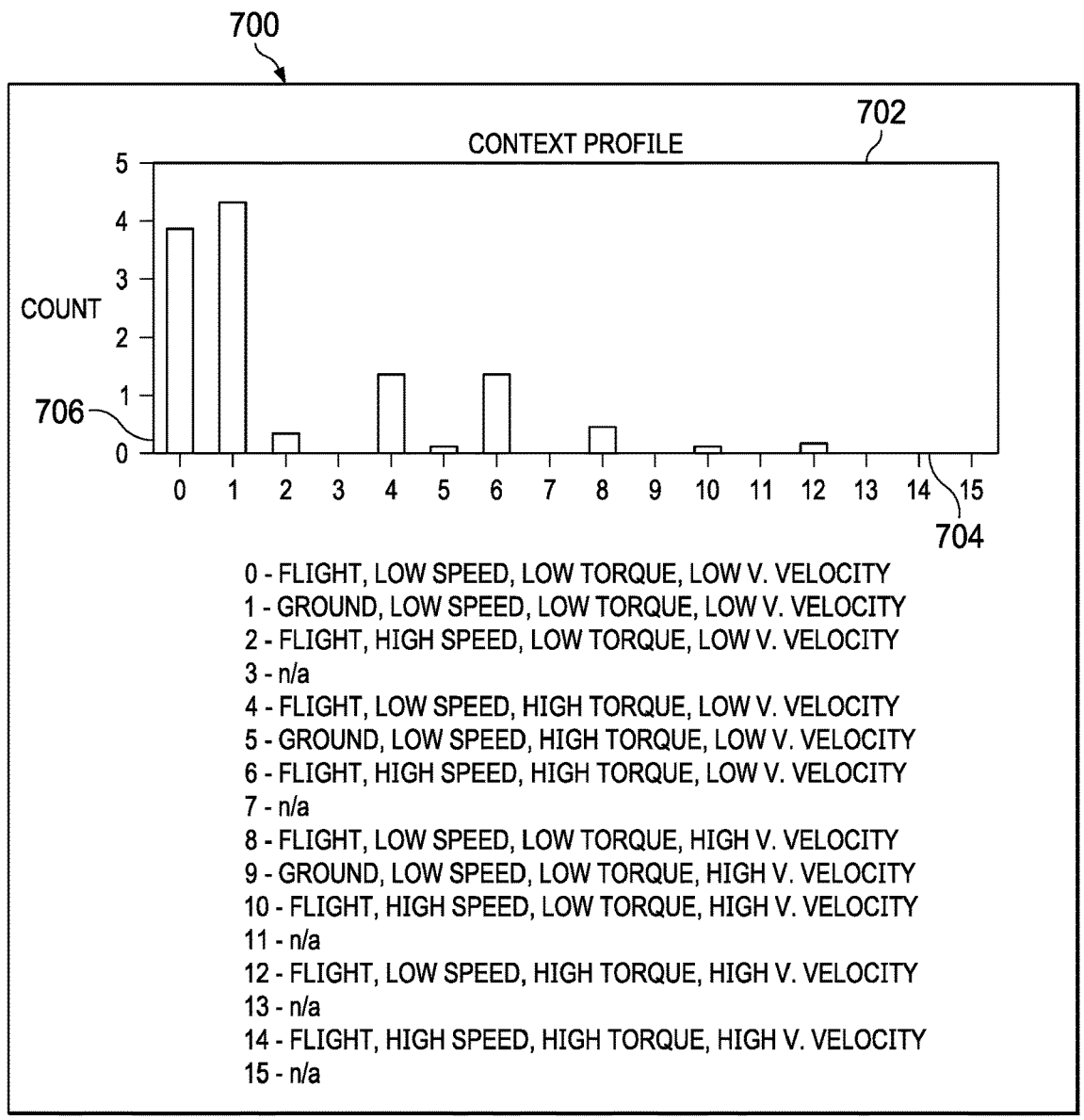
FIG. 7 is an illustration of the context profile in accordance with an illustrative embodiment.
FIG. 8 is an illustration of data structures used by a machine learning model to determine a remaining useful life for component in accordance with an illustrative embodiment.

In FIG. 7 an illustration of the context profile is depicted in accordance with an illustrative embodiment. As depicted, context profile 700 takes the form of histogram 702. In this example, x-axis 704 represents combinations of operating conditions. Y-axis 706 is the count of the number of times that each combination of operating conditions has occurred in the sensor data containing context information from which the operating conditions are derived. This sensor data can be current sensor data being analyzed or can be historical sensor data depending on whether context profile 700 is being used for training machine learning model or being used by the machine learning model to determine remaining useful life of a platform.

The illustration of context profile 700 is only example one manner in which a context profile can be implemented and not meant to limit the form of other context profiles. For example, other context profiles can have other combinations of operating conditions. As another example, other types of charts can be used to represent the distribution of occurrences for combinations of operating conditions. For example, a line graph can be used to identify the counts for different combinations of operating conditions.

With reference now to FIG. 8, an illustration of data structures used by a machine learning model to determine a remaining useful life for component is depicted in accordance with an illustrative embodiment. In this illustrative example, feature vector 800 and coefficient matrix 802 are used to determine remaining useful life vector 804. Remaining useful life vector 804 contains an array of values that identify the remaining useful life for a component. These values can be summed to obtain the remaining useful life.

In one illustrative example, feature vector 800 can comprise metrics such as condition indicators. For example, feature vector 800 can be condition indicators such as x=[3.4914, 1.0767, 1.0773, 2.8534, 0.8981]. These values can be obtained sensor system from a source such as a modern signal processing unit. This vector can be multiplied by coefficient matrix 802 to obtain remaining useful life vector 804. Coefficient matrix 802 can be, for example, a coefficient matrix in coefficient matrices 324 in machine learning model 212 in FIG. 2.

In this illustrative example, remaining useful life vector 804 can be, for example, y=[0.4782, 0.4771, 0.4771, 0.4757, 0.4754, 0.4743, 0.4742, 0.4735, 0.4729, 0.4719, 0.4712, 0.4708, 0.4702, 0.4698, 0.4689]. The sum of these entries can result in a remaining useful life of 7.1013 hours.

As depicted, remaining useful life can be output as the sum of the vector in some illustrative examples. In other illustrative examples, the remaining useful life output by machine learning model can be remaining useful life vector 804.

Figure 9:
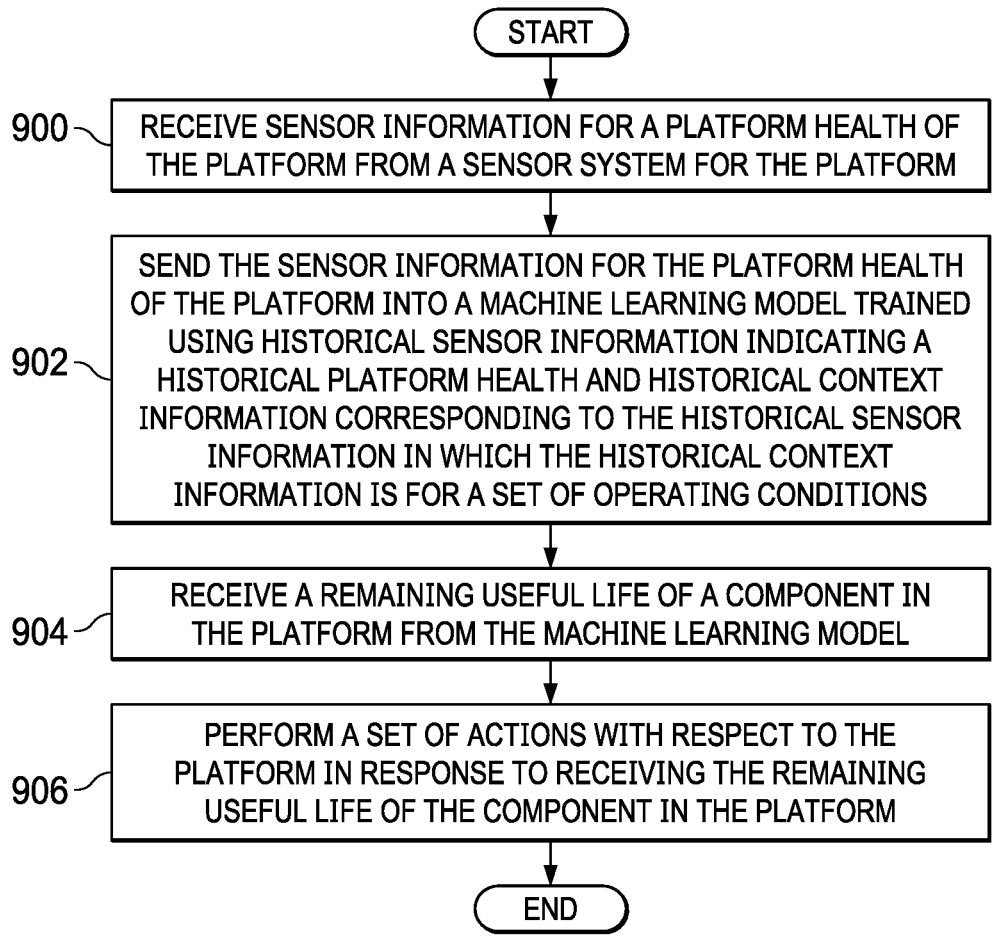
FIG. 9 is an illustration of a flowchart of a process for managing a platform in accordance with an illustrative embodiment.

Turning next to FIG. 9, an illustration of a flowchart of a process for managing a platform is depicted in accordance with an illustrative embodiment. The process in FIG. 9 can be implemented in hardware, software, or both. When implemented in software, the process can take the form of program code that is run by one of more processor units located in one or more hardware devices in one or more computer systems. For example, the process can be implemented in platform manager 130 in FIG. 1 and platform manager 210 in computer system 208 in FIGS. 2-4.

The process begins by receive sensor information for a platform health of the platform from a from a sensor system for the platform (operation 900). The process sends the sensor information for the platform health of the platform into a machine learning model trained using historical sensor information indicating a historical platform health and historical context information corresponding to the historical sensor information in which the historical context information is for a set of operating conditions (operation 902).

The process receives a remaining useful life of a component in the platform from the machine learning model (operation 904). The process performs a set of actions with respect to the platform in response to receiving the remaining useful life of the component in the platform (operation 906). The process terminates thereafter. In operation 906, the set of actions can be from at least one of indicating a maintenance is needed, scheduling the maintenance, aborting a current mission for the platform, activating a backup component to replace the component, or performing the maintenance.

Figure 10:
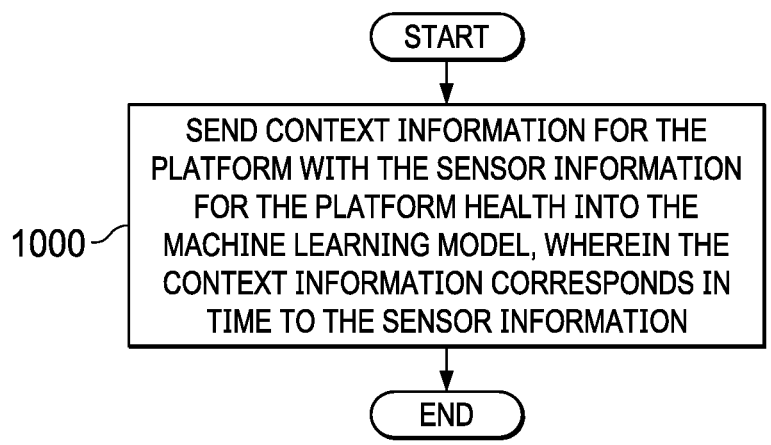
FIG. 10 is an illustration of a flowchart of a process for sending sensor information for a machine learning model in accordance with an illustrative embodiment.

Turning to FIG. 10, an illustration of a flowchart of a process for sending sensor information for a machine learning model is depicted in accordance with an illustrative embodiment. The process in FIG. 10 is an example of an additional step that can be performed in the process in FIG. 9.

The process sends context information for the platform with the sensor information for the platform health into the machine learning model, wherein the context information corresponds in time to the sensor information (operation 1000). The process terminates thereafter.

Figure 11:
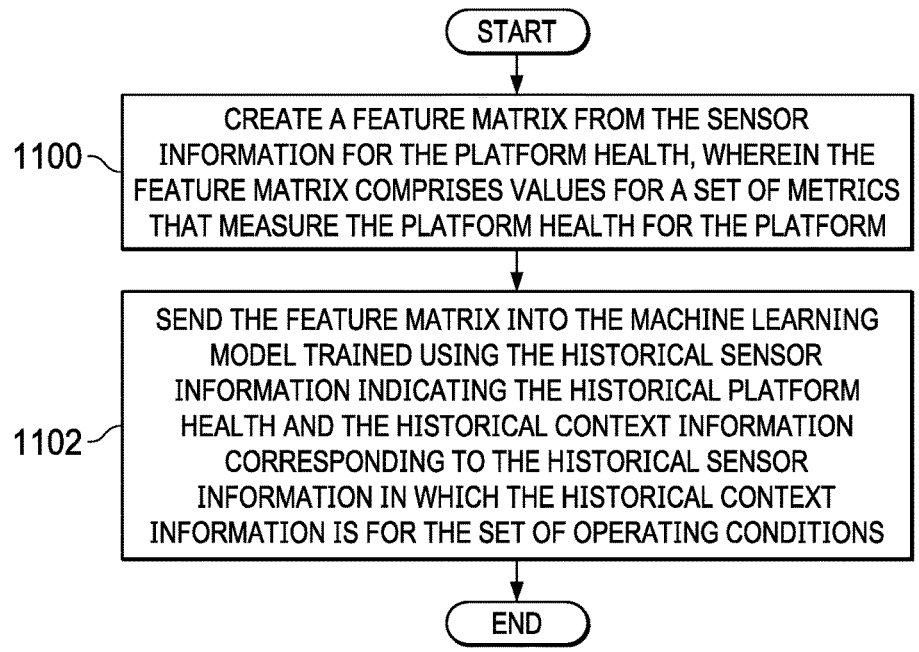
FIG. 11 is an illustration of a flowchart of a process for sending sensor information for a machine learning model in accordance with an illustrative embodiment.

With reference next to FIG. 11, an illustration of a flowchart of a process for sending sensor information for a machine learning model is depicted in accordance with an illustrative embodiment. The process in the flowchart in FIG. 11 is an example of an implementation for operation 902 in FIG. 9.

The process creates a feature matrix from the sensor information for the platform health, wherein the feature matrix comprises values for a set of metrics that measure the platform health for the platform (operation 1100). The process sends the feature matrix into the machine learning model trained using the historical sensor information indicating the historical platform health and the historical context information corresponding to the historical sensor information in which the historical context information is for the set of operating conditions (operation 1102). The process terminates thereafter.

Figure 12:
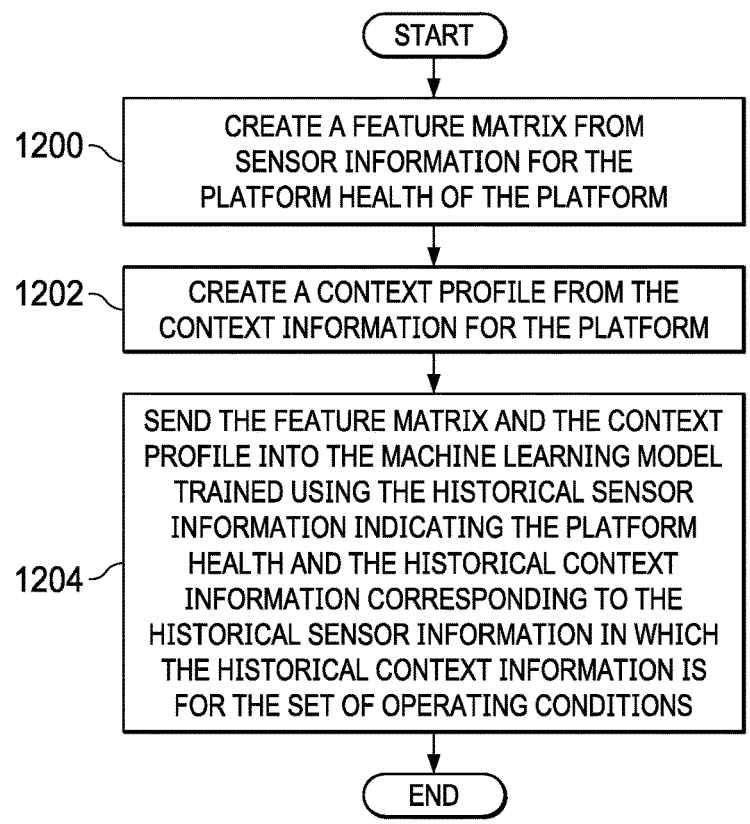
FIG. 12 is another illustration of a flowchart of a process for sending sensor information for a machine learning model in accordance with an illustrative embodiment.

Turning to FIG. 12, another illustration of a flowchart of a process for sending sensor information for a machine learning model is depicted in accordance with an illustrative embodiment. The process in the flowchart in FIG. 12 is another example of an implementation for operation 902 in FIG. 9.

The process creates a feature matrix from sensor information for the platform health of the platform (operation 1200). In operation 1200, the feature matrix comprises values for a set of metrics that measure the platform health for the platform. The process creates a context profile from the context information for the platform (operation 1202).

The process sends the feature matrix and the context profile into the machine learning model trained using the historical sensor information indicating the platform health and the historical context information corresponding to the historical sensor information in which the historical context information is for the set of operating conditions (operation 1204). The process terminates thereafter.

Figure 13:
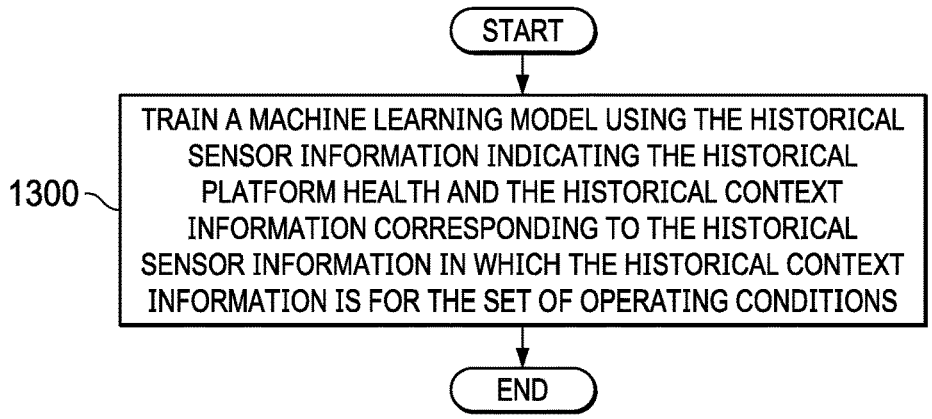
FIG. 13 is an illustration of a flowchart of a process for training a machine learning model to determine a remaining useful life in accordance with an illustrative embodiment.

Turning now to FIG. 13, an illustration of a flowchart of a process for training a machine learning model to determine a remaining useful life is depicted in accordance with an illustrative embodiment. The process in FIG. 13 can be implemented in hardware, software, or both. When implemented in software, the process can take the form of program code that is run by one of more processor units located in one or more hardware devices in one or more computer systems. For example, the process can be implemented in platform manager 130 in FIG. 1 and platform manager 210 in computer system 208 in FIGS. 2-4.

The process trains a machine learning model using the historical sensor information indicating the historical platform health and the historical context information corresponding to the historical sensor information in which the historical context information is for the set of operating conditions (operation 1300). The process terminates thereafter.

Figure 14:
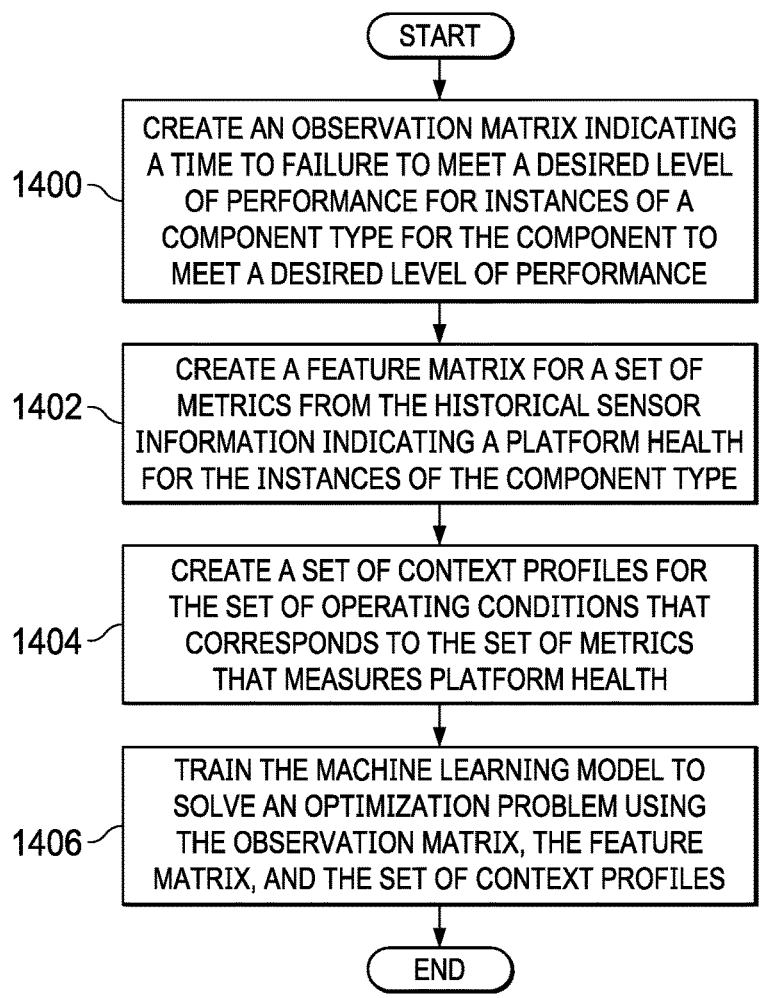
FIG. 14 is an illustration of a flowchart of a process for training a machine learning model to determine a remaining useful life in accordance with an illustrative embodiment.

Turning now to FIG. 14, an illustration of a flowchart of a process for training a machine learning model to determine a remaining useful life is depicted in accordance with an illustrative embodiment. The process in FIG. 14 is an example of an implementation of operation 1300 in FIG. 13.

The process creates an observation matrix indicating a time to failure to meet a desired level of performance for instances of a component type for the component to meet a desired level of performance (operation 1400). The process creates a feature matrix for a set of metrics from the historical sensor information indicating a platform health for the instances of the component type (operation 1402). In operation 1402, the historical sensor information corresponds to the time to failure to meet the desired level of performance for the instances of the component type. The process creates a set of context profiles for the set of operating conditions that corresponds to the set of metrics that measures platform health (operation 1404).

The process trains the machine learning model to solve an optimization problem using the observation matrix, the feature matrix, and the set of context profiles (operation 1406). The process terminates thereafter. This training modifies the machine learning model to more accurately predict a remaining useful life for a component or a group of components.

The process in FIG. 14 can be performed for many types of components to train a machine learning model to predict a remaining useful life for different types of components. In other illustrative examples, the machine learning model be trained to be specialized for predicting remaining useful life for a particular type of component. In yet another illustrative example, the machine learning model can be trained to predict the remaining useful life for a particular type of platform.

Figure 15:
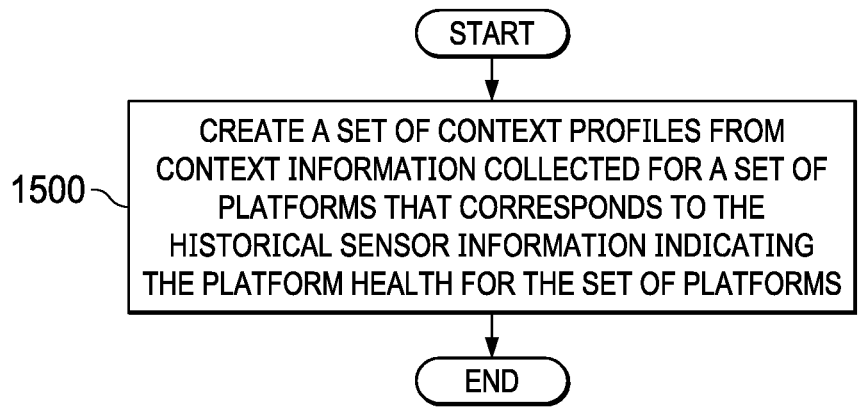
FIG. 15 is an illustration of a flowchart of a process for training a machine learning model to determine a remaining useful life in accordance with an illustrative embodiment.

With reference to FIG. 15, an illustration of a flowchart of a process for training a machine learning model to determine a remaining useful life is depicted in accordance with an illustrative embodiment. The process in FIG. 15 is depicts an example of an implementation for operation that can be performed with the operations in operation 1400 in FIG. 14.

The process creates the set of context profiles from context information collected for a set of platforms that corresponds to the historical sensor information indicating the platform health for the set of platforms (operation 1500). The process terminates thereafter.

Figure 16:
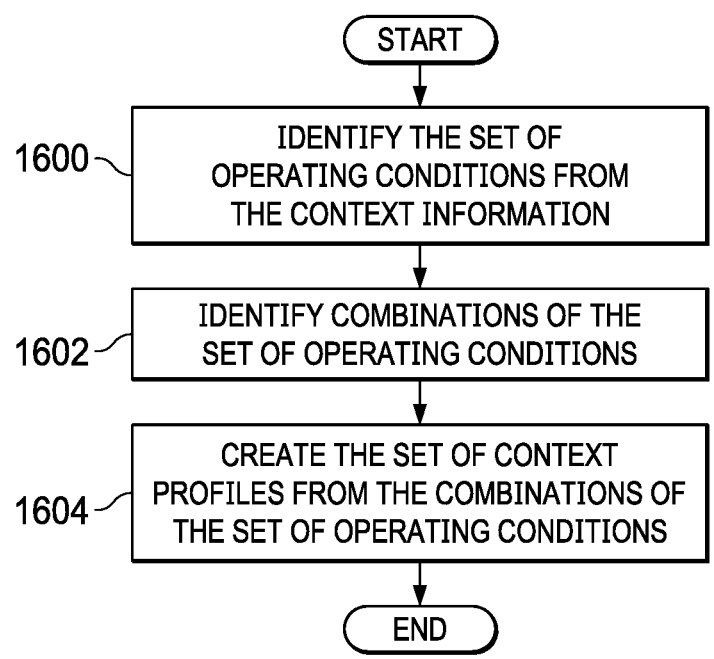
FIG. 16 is an illustration of a flowchart of a process for creating a set of context profiles in accordance with an illustrative embodiment.

In FIG. 16, an illustration of a flowchart of a process for creating a set of context profiles is depicted in accordance with an illustrative embodiment. The flowchart in FIG. 16 is an example of an implementation for operation 1500 in FIG. 15.

The process identifies the set of operating conditions from the context information (operation 1600). The process identifies combinations of the set of operating conditions (operation 1602). The process creates the set of context profiles from the combinations of the set of operating conditions (operation 1604). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 17:
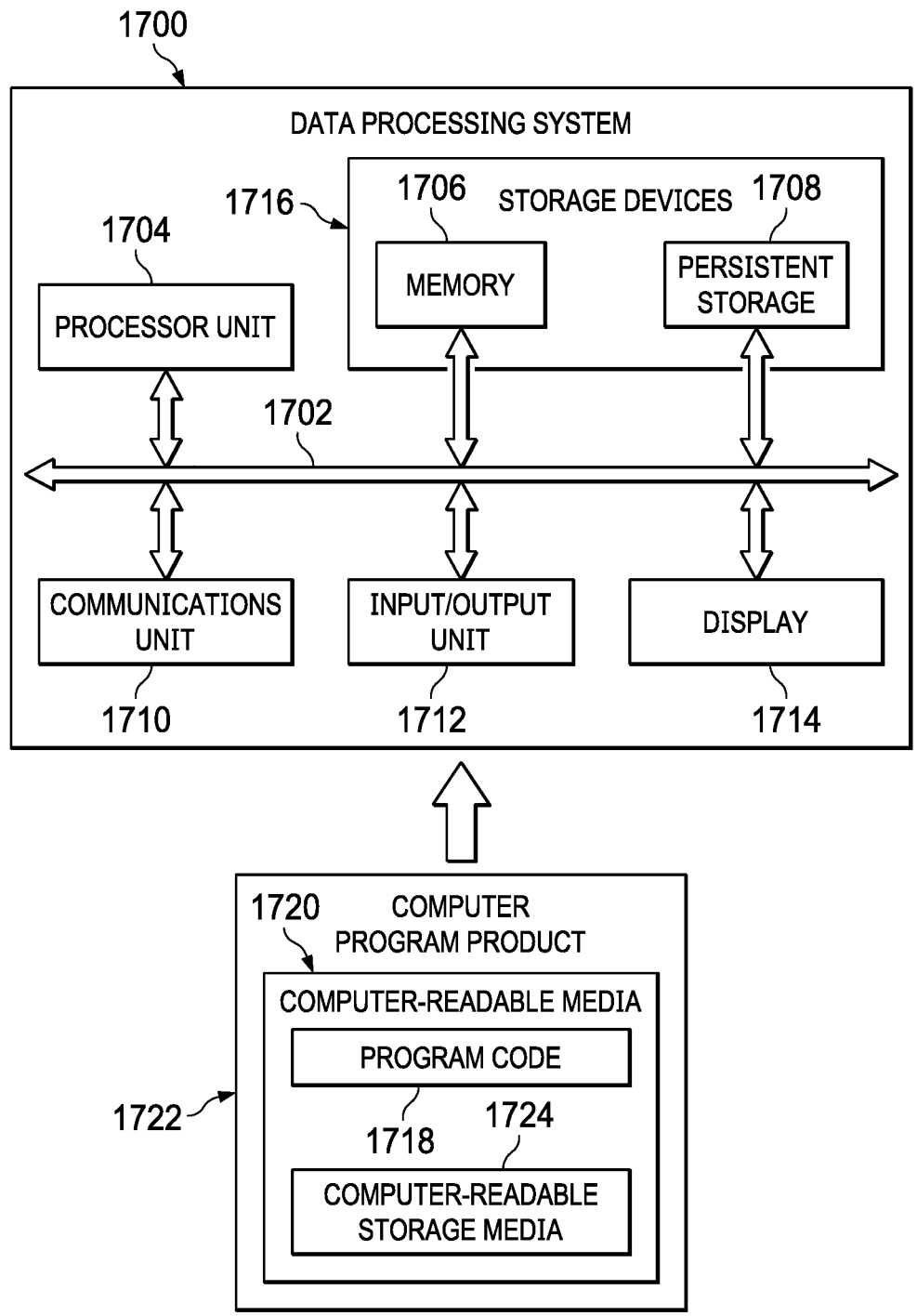
FIG. 17 is an illustration of a block diagram of a data processing system in accordance with an illustrative embodiment.

Turning now to FIG. 17, an illustration of a block diagram of a data processing system is depicted in accordance with an illustrative embodiment. Data processing system 1700 can be used to implement server computer 104, server computer 106, client devices 110, in FIG. 1. Data processing system 1700 can also be used to implement computer system 208 in FIG. 2. In this illustrative example, data processing system 1700 includes communications framework 1702, which provides communications between processor unit 1704, memory 1706, persistent storage 1708, communications unit 1710, input/output (I/O) unit 1712, and display 1714. In this example, communications framework 1702 takes the form of a bus system.

Processor unit 1704 serves to execute instructions for software that can be loaded into memory 1706. Processor unit 1704 includes one or more processors. For example, processor unit 1704 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1704 can may be implemented using one or more heterogeneous processor systems in which a main processor is present with secondary processors on a single chip. As another illustrative example, processor unit 1704 can be a symmetric multi-processor system containing multiple processors of the same type on a single chip.

Memory 1706 and persistent storage 1708 are examples of storage devices 1716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1716 may also be referred to as computer-readable storage devices in these illustrative examples. Memory 1706, in these examples, can be, for example, a random-access memory or any other suitable volatile or non-volatile storage device. Persistent storage 1708 can take various forms, depending on the particular implementation.

For example, persistent storage 1708 may contain one or more components or devices. For example, persistent storage 1708 can be a hard drive, a solid-state drive (SSD), a flash memory, a rewritable optical disk, a rewritable magnetic tape, or some combination of the above. The media used by persistent storage 1708 also can be removable. For example, a removable hard drive can be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that can be connected to data processing system 1700. For example, input/output unit 1712 can provide a connection for user input through at least one of a keyboard, a mouse, or some other suitable input device. Further, input/output unit 1712 can send output to a printer. Display 1714 provides a mechanism to display information to a user.

Instructions for at least one of the operating system, applications, or programs can be located in storage devices 1716, which are in communication with processor unit 1704 through communications framework 1702. The processes of the different embodiments can be performed by processor unit 1704 using computer-implemented instructions, which can be located in a memory, such as memory 1706.

These instructions are program instructions and are also referred to as program code, computer usable program code, or computer-readable program code that can be read and executed by a processor in processor unit 1704. The program code in the different embodiments can be embodied on different physical or computer-readable storage media, such as memory 1706 or persistent storage 1708.

Program code 1718 is located in a functional form on computer-readable media 1720 that is selectively removable and can be loaded onto or transferred to data processing system 1700 for execution by processor unit 1704. Program code 1718 and computer-readable media 1720 form computer program product 1722 in these illustrative examples. In the illustrative example, computer-readable media 1720 is computer-readable storage media 1724.

Computer-readable storage media 1724 is a physical or tangible storage device used to store program code 1718 rather than a media that propagates or transmits program code 1718. Computer readable storage media 1724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1718 can be transferred to data processing system 1700 using a computer-readable signal media. The computer-readable signal media are signals and can be, for example, a propagated data signal containing program code 1718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1720" can be singular or plural. For example, program code 1718 can be located in computer-readable media 1720 in the form of a single storage device or system. In another example, program code 1718 can be located in computer-readable media 1720 that is distributed in multiple data processing systems. In other words, some instructions in program code 1718 can be located in one data processing system while other instructions in program code 1718 can be located in one data processing system. For example, a portion of program code 1718 can be located in computer-readable media 1720 in a server computer while another portion of program code 1718 can be located in computer-readable media 1720 located in a set of client computers.

The different components illustrated for data processing system 1700 are not meant to provide architectural limitations to the manner in which different embodiments can be implemented. In some illustrative examples, one or more of the components may be incorporated in or otherwise form a portion of, another component. For example, memory 1706, or portions thereof, can be incorporated in processor unit 1704 in some illustrative examples. The different illustrative embodiments can be implemented in a data processing system including components in addition to or in place of those illustrated for data processing system 1700. Other components shown in FIG. 17 can be varied from the illustrative examples shown. The different embodiments can be implemented using any hardware device or system capable of running program code 1718.

Figure 18:
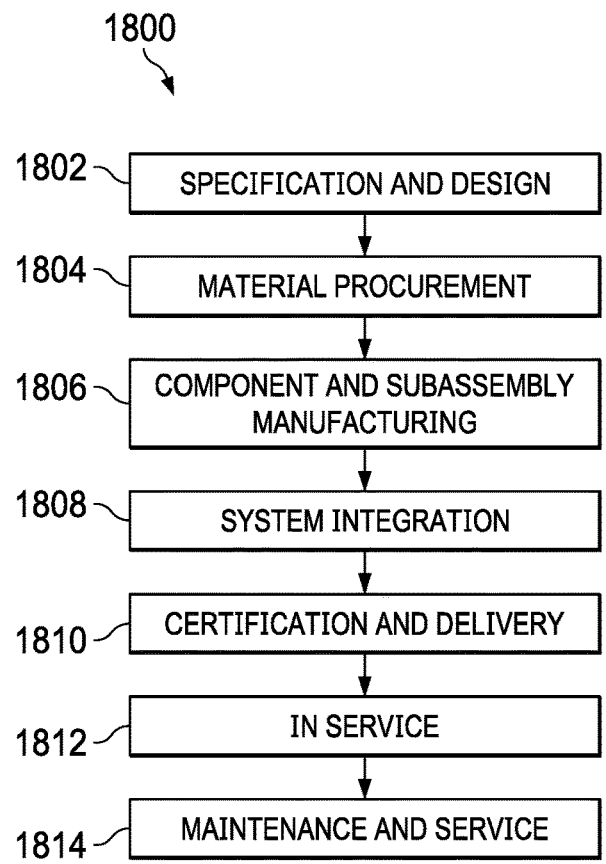
FIG. 18 is an illustration of a block diagram of an aircraft manufacturing and service method in accordance with an illustrative embodiment.
Figure 19:
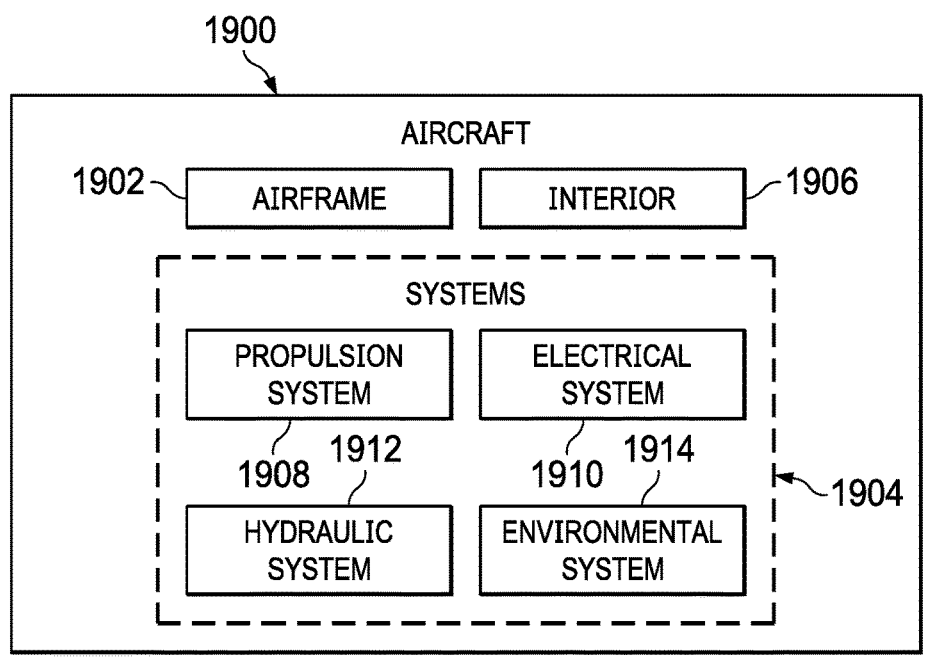
FIG. 19 is an illustration of a block diagram of an aircraft in which an illustrative embodiment may be implemented.

Illustrative embodiments of the disclosure may be described in the context of aircraft manufacturing and service method 1800 as shown in FIG. 18 and aircraft 1900 as shown in FIG. 19. Turning first to FIG. 18, an illustration of a block diagram of an aircraft manufacturing and service method is depicted in accordance with an illustrative embodiment. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 in FIG. 19 can go through certification and delivery 1810 in order to be placed in service 1812. While in service 1812 by a customer, aircraft 1900 in FIG. 19 is scheduled for routine maintenance and service 1814, which may include modification, reconfiguration, refurbishment, and other maintenance or service.

In the illustrative example, platform manager 130 in FIG. 1 and platform manager 210 in FIG. 2 can operate to manage maintenance for aircraft 1900 during routine maintenance and service 1814. The prediction of remaining useful life by platform manager 130 in FIG. 1 and platform manager 210 in FIG. 2 platform manager 130 in FIG. 1 and platform manager 210 in FIG. 2 while aircraft 1900 is in service 1812.

Each of the processes of aircraft manufacturing and service method 1800 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of an aircraft is depicted in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1800 in FIG. 18.

In one illustrative example, components or subassemblies produced in component and subassembly manufacturing 1806 in FIG. 18 can be fabricated or manufactured in a manner similar to components or subassemblies produced while aircraft 1900 is in service 1812 in FIG. 18. As yet another example, one or more apparatus embodiments, method embodiments, or a combination thereof can be utilized during production stages, such as component and subassembly manufacturing 1806 and system integration 1808 in FIG. 18. One or more apparatus embodiments, method embodiments, or a combination thereof may be utilized while aircraft 1900 is in service 1812, during maintenance and service 1814 in FIG. 18, or both. The use of a number of the different illustrative embodiments may substantially expedite the assembly of aircraft 1900, reduce the cost of aircraft 1900, or both expedite the assembly of aircraft 1900 and reduce the cost of aircraft 1900.

Some features of the illustrative examples are described in the following clauses. These clauses are examples of features not intended to limit other illustrative examples.

Clause 1:

A method for managing a platform, the method comprising:
  receiving, from a sensor system for the platform, sensor information for a platform health of the platform;
  sending, by a computer system, the sensor information for the platform health of the platform into a machine learning model trained using historical sensor information indicating a historical platform health and historical context information corresponding to the historical sensor information in which the historical context information is for a set of operating conditions; and
  receiving, by the computer system, a remaining useful life of a component in the platform from the machine learning model.

Clause 2:

The method according to clause 1 further comprising:
  sending, by the computer system, context information for the platform with the sensor information for the platform health into the machine learning model, wherein the context information corresponds in time to the sensor information.

Clause 3:

The method according to one of clauses 1 or 2, wherein sending, by the computer system, the sensor information for the platform health into the machine learning model trained using the historical sensor information indicating the historical platform health and the historical context information corresponding to the historical sensor information in which the historical context information is for the set of operating conditions comprises:
  creating, by the computer system, a feature matrix from the sensor information for the platform health, wherein the feature matrix comprises values for a set of metrics that measure the platform health for the platform; and
  sending, by the computer system, the feature matrix into the machine learning model trained using the historical sensor information indicating the historical platform health and the historical context information corresponding to the historical sensor information in which the historical context information is for the set of operating conditions.

Clause 4:

The method according to one of clauses 1, 2, or 3, wherein sending, by the computer system, the sensor information into the machine learning model trained using the historical sensor information indicating the historical platform health and the historical context information corresponding to the historical sensor information in which the historical context information is for the set of operating conditions comprises:

creating, by the computer system, a feature matrix from the sensor information for the platform health of the platform, wherein the feature matrix comprises values for a set of metrics that measure the platform health for the platform;

creating, by the computer system, a context profile from the context information for the platform; and sending, by the computer system, the feature matrix and the context profile into the machine learning model trained using the historical sensor information indicating the platform health and the historical context information corresponding to the historical sensor information in which the historical context information is for the set of operating conditions.

Clause 5:

The method according to one of clauses 1, 2, 3, or 4 further comprising:

performing, by the computer system, a set of actions with respect to the platform in response to receiving the remaining useful life of the component in the platform.

Clause 6:

The method according to clause 5, wherein the set of actions is selected from at least one of indicating a maintenance is needed, scheduling the maintenance, aborting a current mission for the platform, activating a backup component to replace the component, or performing the maintenance.

Clause 7:

The method according to one of clauses 1, 2, 3, 4, 5, or 6 further comprising:

training, by the computer system, the machine learning model using the historical sensor information indicating the historical platform health and the historical context information corresponding to the historical sensor information in which the historical context information is for the set of operating conditions.

Clause 8:

The method according to clause 7, wherein training, by the computer system, the machine learning model using the historical sensor information indicating the historical platform health and the historical context information corresponding to the historical sensor information in which the historical context information is for the set of operating conditions comprises:

creating, by the computer system, an observation matrix indicating a time to failure to meet a desired level of performance for instances of a component type for the component to meet the desired level of performance;

creating, by the computer system, a feature matrix for a set of metrics from the historical sensor information indicating the platform health for the instances of the component type, wherein the historical sensor information corresponds to the time to failure to meet the desired level of performance for the instances of the component type;

creating, by the computer system, a set of context profiles for the set of operating conditions that corresponds to the set of metrics that measures platform health; and training, by the computer system, the machine learning model to solve an optimization problem using the observation matrix, the feature matrix, and the set of context profiles.

Clause 9:

The method according to clause 8, wherein the optimization problem is as follows:

$$\text{Solve } B \text{ by:} \min_{XB \in P} \frac{1}{2} \|Y - XB\|_F^2 + \frac{\lambda_1}{2} \|B\|_F^2 + \lambda_2 \|B\|_{2,1}$$

wherein B is a coefficient matrix, Y is the observation matrix, X is the feature matrix, $\lambda_1 > 0$ is a parameter that tunes an importance of a second term $$\frac{\lambda_1}{2} \|B\|_F^2,$$

$\lambda_2 > 0$ is a parameter that tunes an importance of a term, $P = \{Y \geq 0, Y_{ij} \geq Y_{il} | j \leq l, \forall j=1, \ldots, k, \forall l=1, \ldots, k\}$ is a space of non-negative non-increasing list structure that the observation matrix follows and F is a Frobenius norm, which is defined as $\|M\|_F = \sqrt{\sum_{i=1}^{n} \sum_{j=1}^{m} M_{ij}^2}$ and the $l_{2,1}$-norm is defined as $\|M\|_{2,1} = \sum_{i=i}^{n} \sqrt{\sum_{j=1}^{m} M_{ij}^2}$.

Clause 10:

The method according to clause 8 further comprising:

creating, by the computer system, the set of context profiles from context information collected for a set of platforms that corresponds to the historical sensor information indicating the platform health for the set of platforms.

Clause 11:

The method according to clause 10, wherein creating, by the computer system, the set of context profiles from the historical context information collected for the set of platforms that corresponds to the historical sensor information indicating the platform health comprises:

identifying, by the computer system, the set of operating conditions from the context information;

identifying, by the computer system, combinations of the set of operating conditions; and creating, by the computer system, the set of context profiles from the combinations of the set of operating conditions.

Clause 12:

The method according to clause 11 further comprising:

training, by the computer system, the machine learning model using historical sensor information indicating the platform health and the set of context profiles.

Clause 13:

The method according to clause 11, wherein the set of operating conditions is selected from least one of an operational condition, a state of the platform, or an environment for the platform.

Clause 14:

The method according to one of clauses 1, 2, 3, 4, 5, 6, 7, 8, 9, 10, 11, 12, or 13, wherein the machine learning model is selected from one of a multi-task machine learning model, a multi-task learning model for survival analysis, a time-varying multi-task learning model for survival analysis, an artificial neural network, a cognitive system, a Bayesian network, and a fuzzy logic system.

Clause 15:

The method according one of clauses 1, 2, 3, 4, 5, 6, 7, 8, 9, 10, 11, 12, 13, or 14, wherein the platform is selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, and a building.

Clause 16:

A method for managing a platform, the method comprising:
  creating, by a computer system, an observation matrix indicating a time to failure to meet a desired level of performance for instances of a component type;
  creating, by the computer system, a feature matrix for a set of metrics that measure a platform health from sensor information indicating the platform health for the component type of a component, wherein the sensor information corresponds to the time to failure to meet the desired level of performance for instances of the component type;
  creating, by the computer system, a set of context profiles for a set of operating conditions that is a context for the set of metrics that measures the platform health; and
  training, by the computer system, a machine learning model to solve an optimization problem using the observation matrix, the feature matrix, and the set of context profiles.

Clause 17:

The method according to clause 16, wherein the optimization problem is as follows:

$$\text{Solve } B \text{ by: } \min_{XB \in P} \frac{1}{2} \|Y - XB\|_F^2 + \frac{\lambda_1}{2} \|B\|_F^2 + \lambda_2 \|B\|_{2,1}$$

wherein B is a coefficient matrix, Y is the observation matrix, X is the feature matrix, $\lambda_1 > 0$ is a parameter that tunes an importance of a second term $$\frac{\lambda_1}{2} \|B\|_F^2,$$

$\lambda_2 > 0$ is a parameter that tunes an importance of a third term $\lambda_2 \|B\|_{2,1}$, $P = \{Y \geq 0, Y_{ij} \geq Y_{il} | j \leq l, \forall j = 1, \ldots, k, \forall l = 1, \ldots, k\}$ is a space of non-negative non-increasing list structure that the observation matrix follows and F is a Frobenius norm, which is defined as $\|M\|_F = \sqrt{\sum_{i=1}^{n} \sum_{j=1}^{m} M_{ij}^2}$ and a $l_{2,1}$-norm is defined as $\|M\|_{2,1} = \sum_{i=1}^{n} \sqrt{\sum_{j=1}^{m} M_{ij}^2}$.

Clause 18:

The method according to one of clauses 16 or 17 further comprising:
  receiving, from a sensor system for the platform, sensor information for the platform health of the platform;
  sending, by the computer system, the sensor information for the platform health of the platform into the machine learning model; and
  receiving, by the computer system, a remaining useful life of a component in the platform from the machine learning model.

Clause 19:

The method according to clause 18 further comprising:
  performing, by the computer system, a set of actions with respect to the platform in response to receiving the remaining useful life of the component in the platform.

Clause 20:

The method according to clause 19, wherein the set of actions is selected from at least one of indicating a maintenance is needed, scheduling the maintenance, aborting a current mission for the platform, activating a backup component to replace the component, or performing the maintenance.

Clause 21:

A platform management system comprising:
  a computer system;
  a platform manager in the computer system, wherein the platform manager operates to:
    receive sensor information for a platform health of the platform;
    send the sensor information for the platform health of the platform into a machine learning model trained using historical sensor information indicating a historical platform health and historical context information corresponding to the historical sensor information in which the historical context information is for a set of operating conditions; and
    receive a remaining useful life of a component in the platform from the machine learning model.

Clause 22:

The platform management system according to clause 21, wherein the platform manager operates to:
  send context information for the platform with the sensor information for the platform health into the machine learning model, wherein the context information corresponds in time to the sensor information.

Clause 23:

The platform management system according to one of clauses 21 or 22, wherein in sending the sensor information for the platform health into the machine learning model trained using the historical sensor information indicating the historical platform health and the historical context information corresponding to the historical sensor information in which the historical context information is for the set of operating conditions, the platform manager operates to:
  create a feature matrix from the sensor information for the platform health, wherein the feature matrix comprises values for a set of metrics that measure the platform health for the platform; and
  send the feature matrix into the machine learning model trained using the historical sensor information indicating the historical platform health and the historical context information corresponding to the historical sensor information in which the historical context information is for the set of operating conditions.

Clause 24:

The platform management system according to one of clauses 21, 22, or 23, wherein in sending the sensor information into the machine learning model trained using the historical sensor information indicating the historical platform health and the historical context information corresponding to the historical sensor information in which the historical context information is for the set of operating conditions, the platform manager operates to:

create a feature matrix from the sensor information for the platform health of the platform, wherein the feature matrix comprises values for a set of metrics that measure the platform health for the platform;

create a context profile from the context information for the platform; and send the feature matrix and the context profile into the machine learning model trained using the historical sensor information indicating the platform health and the historical context information corresponding to the historical sensor information in which the historical context information is for the set of operating conditions.

Clause 25:

The platform management system according to one of clauses of claim 21, 22, 23, or 24, wherein the platform manager operates to:

perform a set of actions with respect to the platform in response to receiving the remaining useful life of the component in the platform.

Clause 26:

The platform management system according to clause 25, wherein the set of actions is selected from at least one of indicating a maintenance is needed, scheduling the maintenance, aborting a current mission for the platform, activating a backup component to replace the component, or performing the maintenance.

Clause 27:

The platform management system according to one of clauses 21, 22, 23, 24, 25, or 26, wherein the platform manager operates to:

train the machine learning model using the historical sensor information indicating the historical platform health and the historical context information corresponding to the historical sensor information in which the historical context information is for the operating conditions.

Clause 28:

The platform management system according to clause 27, wherein in training the machine learning model using the historical sensor information indicating the historical platform health and the historical context information corresponding to the historical sensor information in which the historical context information is for the operating conditions, the platform manager operates to:

create an observation matrix indicating a time to failure to meet a desired level of performance for instances of a component type for the component;

create a feature matrix for instances of a set of metrics that indicate the platform health from the historical sensor information indicating the platform health for the instances of the component type, wherein the historical sensor information corresponds to the time to failure to meet the desired level of performance for the instances of the component type;

create a set of context profiles for the operating conditions that corresponds to the set of metrics that indicate the platform health; and train the machine learning model to solve an optimization problem using the observation matrix, the feature matrix, and the set of context profiles.

Clause 29:

The platform management system according to clause 28, wherein the optimization problem is as follows:

$$\text{Solve } B \text{ by:} \min_{XB \in P} \frac{1}{2}\|Y - XB\|_F^2 + \frac{\lambda_1}{2}\|B\|_F^2 + \lambda_2\|B\|_{2,1}$$

wherein B is a coefficient matrix, Y is the observation matrix, X is the feature matrix, $\lambda_1 > 0$ is a parameter that tunes an importance of a second term $$\frac{\lambda_1}{2}\|B\|_F^2,$$

$\lambda_2 \geq 0$ is a parameter that tunes an importance of a third term $\lambda_2\|B\|_{2,1}$, P={Y≥0, $Y_{ij} \geq Y_{il}$|j≤l, $\forall$j=1, ..., k, $\forall$l=1, ..., k} is a space of non-negative non-increasing list structure that the observation matrix follows and F is a Frobenius norm, which is defined as $\|M\|_F = \sqrt{\sum_{i=1}^{n}\sum_{j=1}^{m} M_{ij}^2}$ and a $l_{2,1}$-norm is defined as $\|M\|_{2,1} = \sum_{i=i}^{n}\sqrt{\sum_{j=1}^{m} M_{ij}^2}$.]

Clause 30:

The platform management system according to clause 28, wherein the platform manager operates to:

create the set of context profiles from context information collected for a set of platforms that corresponds to the historical sensor information indicating the platform health for the set of platforms.

Clause 31:

The platform management system according to clause 30, wherein in creating the set of context profiles from the historical context information collected for the set of platforms that corresponds to the historical sensor information indicating the platform health, the platform manager operates to:

identify operating conditions from the context information;

identify combinations of the set of operating conditions; and create the set of context profiles from the combinations of the set of operating conditions.

Clause 32:

The platform management system according to clause 31, wherein the platform manager operates to:

train the machine learning model using the historical sensor information indicating the platform health and the set of context profiles.

Clause 33:

The platform management according to clause 31, wherein the set of operating conditions is selected from at least one of an operational condition, a state of the platform, or an environment for the platform.

Clause 34:

The platform management system according to one of clauses 21, 22, 23, 24, 25, 26, 27, 28, 29, 30, 31, 32, or 33, wherein the machine learning model is selected from one of a multi-task machine learning model, a multi-task learning model for survival analysis, a time-varying a multi-task learning model for survival analysis, an artificial neural network, a cognitive system, a Bayesian network, and a fuzzy logic system.

Clause 35:

The platform management system according to one of clauses 21, 22, 23, 24, 25, 26, 27, 28, 29, 30, 31, 32, 33, or 34, wherein the platform is selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, and a building.

Clause 36:

A platform management system comprising:
a computer system; and
a platform manager in the computer system, wherein the platform manager operates to:
create an observation matrix indicating a time to failure to meet a desired level of performance for instances of a component type for a component in the platform;
create a feature matrix for a set of metrics that measure a platform health from historical sensor information indicating the platform health for the component type of the component, wherein the historical sensor information corresponds to the time to failure to meet the desired level of performance for instances of the component type;
create a set of context profiles for operating conditions that are a context for the set of metrics that measures the platform health; and
train a machine learning model to solve an optimization problem using the observation matrix, the feature matrix, and the set of context profiles.

Clause 37:

The platform management system of claim 36, wherein the optimization problem is as follows:
wherein the optimization problem is as follows:

$$\text{Solve } B \text{ by: } \min_{XB \in P} \frac{1}{2} \|Y - XB\|_F^2 + \frac{\lambda_1}{2} \|B\|_F^2 + \lambda_2 \|B\|_{2,1}$$

wherein B is a coefficient matrix, Y is the observation matrix, X is the feature matrix, $\lambda_1 > 0$ is a parameter that tunes an importance of a second term $$\frac{\lambda_1}{2} \|B\|_F^2,$$

$\lambda_2 > 0$ is a parameter that tunes an importance of a third term $\lambda_2 \|B\|_{2,1}$, $P = \{Y \geq 0, Y_{ij} \geq Y_{il} | j \leq l, \forall j=1, \ldots, k, \forall l=1, \ldots, k\}$ is a space of non-negative non-increasing list structure that the observation matrix follows and F is a Frobenius norm, which is defined as $\|M\|_F = \sqrt{\sum_{i=1}^{n} \sum_{j=1}^{m} M_{ij}^2}$ and a $l_{2,1}$-norm is defined as $\|M\|_{2,1} = \sum_{i=i}^{m} \sqrt{\sum_{j=1}^{m} M_{ij}^2}.$]

Clause 38:

The platform management system according to one of clauses 36 or 37, wherein the platform manager operates to:
receive sensor information for the platform health of a platform;
send the sensor information for the platform health of the platform into the machine learning model; and
receive a remaining useful life of the component in the platform from the machine learning model.

Clause 39:

The platform management system according to one of clauses 36, 37, or 38, wherein the platform manager operates to:
perform a set of actions with respect to the platform in response to receiving remaining useful life of the component in the platform.

Clause 40:

The platform management system according to 39, wherein the set of actions is selected from at least one of indicating a maintenance is needed, scheduling the maintenance, aborting a current mission for the platform, activating a backup component to replace the component, or performing the maintenance.

Clause 41:

A computer program product for managing a platform, the computer program product comprising:
a computer-readable storage media;
first program code, stored on the computer-readable storage media, executable by a computer system to cause the computer system to receive, from a sensor system for the platform, sensor information for a platform health of the platform;
second program code, stored on the computer-readable storage media, executable by the computer system to cause the computer system to send the sensor information for the platform health of the platform into a machine learning model trained using historical sensor information indicating historical platform health and historical context information corresponding to the historical sensor information in which the historical context information is for a set of operating conditions; and
third program code, stored on the computer-readable storage media, executable by the computer system to cause the computer system to receive a remaining useful life of a component in the platform from the machine learning model.

Clause 42:

A computer program product for managing a platform, the computer program product comprising:
a computer-readable storage media;
first program code, stored on the computer-readable storage media, executable by a computer system to cause the computer system to create an observation matrix indicating a time to failure to meet a desired level of performance for instances of a component type for a component in the platform;
second program code, stored on the computer-readable storage media, executable by the computer system to cause the computer system to create a feature matrix for instances of a set of metrics from historical sensor information indicating a platform health for the component type of the component, wherein the historical sensor information corresponds to the time to failure to meet the desired level of performance for instances of the component type;
third program code, stored on the computer-readable storage media, executable by the computer system to cause the computer system to create a set of context profiles for a set of operating conditions that is a context for the set of metrics that indicate the platform health; and
fourth program code, stored on the computer-readable storage media, executable by the computer system to cause the computer system to train a machine learning model to solve an optimization problem using the observation matrix, the feature matrix, and the set of context profiles.

Thus, the illustrative examples provide a method, apparatus, system, and computer program product that manages a platform. For example, In the illustrative example, platform manager 130 in FIG. 1 and platform manager 210 in FIG. 2 can operate to manage maintenance for platforms. The prediction of remaining useful life by platform manager 130 in FIG. 1 and platform manager 210 in FIG. 2 platform manager 130 in FIG. 1 and platform manager 210 in FIG. 2 can be used to manage maintenance of platforms in a manner that reduces at least one of out of service time, expense, time constraint burdens, or issues in managing the maintenance of platforms such as aircraft.

In one example, a method for manages a platform. Sensor information for a platform health of the platform is received from a sensor system for the platform. The sensor information for the platform health of the platform is sent by a computer system into a machine learning model trained using historical sensor information indicating a historical platform health and historical context information corresponding to the historical sensor information in which the historical context information is for a set of operating conditions. A remaining useful life of a component in the platform is received by the computer system from the machine learning model.

In another example, a method for trains a machine learning model of use in managing a platform. An observation matrix indicating a time to failure to meet a desired level of performance for instances of a component type is created by a computer system. A feature matrix for a set of metrics that measure a platform health from sensor information indicating the platform health for the component type of the component is created by the computer systems. The sensor information corresponds to the time to failure to meet a desired level of performance for instances of the component type. A set of context profiles for a set of operating conditions that is a context for the set of metrics that measures the platform health is created by the computer system. A machine learning model is trained by the computer system to solve an optimization problem using the observation matrix, the feature matrix, and the set of context profiles.

Thus, the illustrative examples provide an ability to more accurately predict remaining useful life for components and platforms. With the increased accuracy remaining useful life, maintenance can be scheduled in a manner allows for more efficient allocation of resources as well as reducing the amount of time they platform may be out of service. Further, the machine learning models in illustrative examples can adapt to changing states for platforms and take into account context for operating conditions, resulting in increased accuracy in predicting remaining useful life for a component.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a platform, the method comprising:
   receiving, into a platform manager in a computer system, historical sensor information indicating a historical platform health and historical context information corresponding to the historical sensor information in which the historical context information is for a set of operating conditions and comprises timescales;
   forming, by the platform manager, context profiles in a training dataset from the historical context information;
   using historical sensor information and a desired level of performance for a component of the platform in a machine learning algorithm for transforming the context profiles into coefficient matrices while training a time-varying multi-task machine learning model for survival analysis to: handle time-varying feature vectors, obtain a sparse coefficient matrix, and derive a remaining useful life for a component of the platform;
   receiving, by the platform manager, from a sensor system for the platform, sensor information comprising context information and platform health information for a platform health of the platform and forming a context profile;
   sending, by the computer system, the sensor information for the platform health of the platform and the context profile into a trained time-varying multi-task machine learning model for survival analysis;
   transforming, in the trained time-varying multi-task machine learning model for survival analysis, the context profile into coefficient matrices and therefrom deriving a remaining useful life vector for the component of the platform; and
   procuring, using the remaining useful life vector, resources comprising components for service and repair of the component in the platform.

2. The method of claim 1, wherein:
   the sensor information comprises high-dimensional feature space;
   the coefficient matrices are derived from transforming histograms derived from transforming context profiles derived from transforming the historical context information; and
   further comprising sending, by the computer system, context information for the platform with the sensor information for the platform health into the trained time-varying multi-task machine learning model for survival analysis, wherein the context information corresponds in time to the sensor information.

3. The method of claim 1, wherein the sensor information comprises non-uniform data samples, and further comprising:
   creating, by the computer system, a feature matrix from the sensor information for the platform health, wherein the feature matrix comprises feature vectors comprising values for a set of metrics that measure the platform health for the platform; and sending, by the computer system, the feature matrix into the trained time-varying multi-task machine learning model for survival analysis using the historical sensor information indicating the historical platform health and the historical context information corresponding to the historical sensor information in which the historical context information is for the set of operating conditions.

4. The method of claim 1, wherein the sensor information comprises potentially hidden variables, and further comprising:

creating, by the computer system, a feature matrix from the sensor information for the platform health of the platform, wherein the feature matrix comprises values for a set of metrics that measure the platform health for the platform;

creating, by the computer system, a context profile from context information for the platform; and sending, by the computer system, the feature matrix and the context profile into the trained time-varying multi-task machine learning model for survival analysis using the historical sensor information indicating the platform health and the historical context information corresponding to the historical sensor information in which the historical context information is for the set of operating conditions.

5. The method of claim 1, wherein the component lacks an associated physics model describing underlying system dynamics associated with the component, and further comprising performing, by the computer system, a set of actions with respect to the platform in response to receiving the remaining useful life of the component in the platform.

6. The method of claim 5, wherein the set of actions is selected from at least one of indicating a maintenance is needed, scheduling the maintenance, aborting a current mission for the platform, activating a backup component to replace the component, or performing the maintenance.

7. The method of claim 1, further comprising:

training, by the computer system, the time-varying multi-task machine learning model for survival analysis using the historical sensor information indicating the historical platform health and the historical context information corresponding to the historical sensor information in which the historical context information is for the set of operating conditions.

8. The method of claim 7, wherein training further comprises:

creating, by the computer system, an observation matrix indicating a time to failure to meet a desired level of performance for instances of a component type for the component to meet the desired level of performance;

creating, by the computer system, a feature matrix for a set of metrics from the historical sensor information indicating the platform health for the instances of the component type, wherein the historical sensor information corresponds to the time to failure to meet the desired level of performance for the instances of the component type;

creating, by the computer system, a set of context profiles for the set of operating conditions that corresponds to the set of metrics that measures platform health; and training, by the computer system, the time-varying multi-task machine learning model for survival analysis to solve an optimization problem using the observation matrix, the feature matrix, and the set of context profiles.

9. The method of claim 8 further comprising:

creating, by the computer system, the set of context profiles from context information collected for a set of platforms that corresponds to the historical sensor information indicating the platform health for the set of platforms.

10. The method of claim 9, wherein creating, by the computer system, the set of context profiles from the historical context information collected for the set of platforms that corresponds to the historical sensor information indicating the platform health comprises:

identifying, by the computer system, the set of operating conditions from the context information;

identifying, by the computer system, combinations of the set of operating conditions; and creating, by the computer system, the set of context profiles from the combinations of the set of operating conditions.

11. The method of claim 10, wherein the set of operating conditions is selected from least one of an operational condition, a state of the platform, or an environment for the platform.

12. The method of claim 1, wherein the trained time-varying multi-task learning model for survival analysis is configured to process time-varying feature vectors.

13. The method of claim 1, wherein the platform is selected from a group comprising a mobile platform, a stationary platform, a land-based structure, an aquatic-based structure, a space-based structure, an aircraft, a commercial aircraft, a rotorcraft, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a space station, a satellite, a submarine, an automobile, a power plant, a bridge, a dam, a house, a manufacturing facility, and a building.

14. A method for managing a platform, the method comprising:

receiving, into a platform manager in a computer system, historical sensor information indicating a historical platform health and historical context information corresponding to the historical sensor information in which the historical context information is for a set of operating conditions;

forming, by the platform manager, context profiles in a training dataset from the historical context information;

transforming the context profiles into coefficient matrices used with historical sensor information for training a time-varying multi-task machine learning model for survival analysis to: handle time-varying feature vectors, obtain a sparse coefficient matrix, and derive a remaining useful life for a component of the platform;

receiving, by the platform manager, from a sensor system for the platform, sensor information comprising context information and platform health information for a platform health of the platform a feature matrix and a context profile;

creating, by a computer system, an observation matrix indicating a time to failure to meet a desired level of performance for instances of a component type;

creating, by the computer system, a feature matrix comprising feature vectors for a set of metrics that measure a platform health from sensor information indicating the platform health for the component type of a component, wherein the sensor information corresponds to the time to failure to meet the desired level of performance for instances of the component type;

creating, by the computer system, a set of context profiles for a set of operating conditions that is a context for the set of metrics that measures the platform health;

transforming, using a trained time-varying multi-task machine learning model for survival analysis, the context profile into coefficient matrices and therefrom solving an optimization problem using the observation matrix, the feature matrix, and a set of coefficient matrices derived from the set of context profiles and deriving a remaining useful life vector; and procuring, using the remaining useful life vector, resources comprising components for service and repair of the component in the platform.

15. The method of claim 14 further comprising:

receiving, from a sensor system for the platform, sensor information for the platform health of the platform;

sending, by the computer system, the sensor information for the platform health of the platform into the trained time-varying multi-task machine learning model for survival analysis; and receiving, by the computer system, a remaining useful life of a component in the platform from the trained time-varying multi-task machine learning model for survival analysis.

16. The method of claim 15 further comprising:

performing, by the computer system, a set of actions with respect to the platform in response to receiving the remaining useful life of the component in the platform.

17. A platform management system that comprises:

a computer system; and a platform manager in the computer system, wherein the platform manager is configured to:

receive sensor information for a platform health of a platform and context information corresponding to the information for the platform health of the platform;

send the sensor information for the platform health of the platform and the context information into a time-varying multi-task machine learning model for survival analysis trained based upon:

historical sensor information of a historical platform health; and historical context information that corresponds to the historical sensor information, wherein the historical context information is for a set of operating conditions transformed into feature coefficients;

transform, in a trained time-varying multi-task machine learning model for survival analysis, the context profile into coefficient matrices and therefrom derive a remaining useful life vector for a component of the platform;

receive, in the platform manager, the remaining useful life vector of the component in the platform from the trained time-varying multi-task machine learning model for survival analysis; and procure, based upon the remaining useful life vector, resources comprising components for service and repair of the component in the platform.

18. The platform management system of claim 17, wherein the platform manager operates to: send context information for the platform with the sensor information for the platform health into the trained time-varying multi-task machine learning model for survival analysis, wherein the context information corresponds in time to the sensor information.

19. The platform management system of claim 17, further comprising the platform manager configured to:

create a feature matrix from the sensor information for the platform health, wherein the feature matrix comprises feature vectors that comprise values for a set of metrics that measure the platform health for the platform; and send the feature matrix into the trained time-varying multi-task machine learning model for survival analysis trained using the historical sensor information indicating the historical platform health and the historical context information corresponding to the historical sensor information in which the historical context information is for the set of operating conditions.

20. The platform management system of claim 17, wherein the platform manager is further configured to:

create a feature matrix from the sensor information for the platform health of the platform, wherein the feature matrix comprises values for a set of metrics that measure the platform health for the platform;

create a context profile from context information for the platform; and send the feature matrix and the context profile into the trained time-varying multi-task machine learning model for survival analysis trained using the historical sensor information indicating the platform health and the historical context information corresponding to the historical sensor information in which the historical context information is for the set of operating conditions.

21. The platform management system of claim 17, wherein the platform manager operates to:

perform a set of actions with respect to the platform in response to receiving the remaining useful life vector of the component in the platform.

22. The platform management system of claim 21, wherein the set of actions is selected from at least one of indicating a maintenance is needed, scheduling the maintenance, aborting a current mission for the platform, activating a backup component to replace the component, or performing the maintenance.

23. The platform management system of claim 17, wherein the platform manager operates to:

train the time-varying multi-task machine learning model for survival analysis using the historical sensor information indicating the historical platform health and the historical context information corresponding to the historical sensor information in which the historical context information is for the operating conditions.

24. The platform management system of claim 23, wherein the platform manager is further configured to:

create an observation matrix indicating a time to failure to meet a desired level of performance for instances of a component type for the component;

create a feature matrix for instances of a set of metrics that indicate the platform health from the historical sensor information indicating the platform health for the instances of the component type, wherein the historical sensor information corresponds to the time to failure to meet the desired level of performance for the instances of the component type;

create a set of context profiles for the operating conditions that corresponds to the set of metrics that indicate the platform health; and train the machine learning model to solve an optimization problem using the observation matrix, the feature matrix, and the set of context profiles.

25. The platform management system of claim 24, wherein the platform manager operates to:
create the set of context profiles from context information collected for a set of platforms that corresponds to the historical sensor information indicating the platform health for the set of platforms.

26. The platform management system of claim 25, wherein in creating the set of context profiles from the historical context information collected for the set of platforms that corresponds to the historical sensor information indicating the platform health, the platform manager operates to:
identify operating conditions from the context information;
identify combinations of the set of operating conditions; and
create the set of context profiles from the combinations of the set of operating conditions.

27. The platform management system of claim 26, wherein the set of operating conditions is selected from at least one of an operational condition, a state of the platform, or an environment for the platform.

28. A platform management system that comprises:
a computer system configured to:
receive historical sensor information that indicates a historical platform health and historical context information that corresponds to the historical sensor information in which the historical context information is for a set of operating conditions;
transform the historical context information into coefficient matrices used with historical sensor information to train a time-varying multi-task machine learning model for survival analysis; and
a platform manager in the computer system, wherein the platform manager is configured to execute program codes configured to receive platform health information and context information from a sensor system of a platform:
create an observation matrix indicating a time to failure to meet a desired level of performance for instances of a component type for a component in the platform;
create a feature matrix for a set of metrics that measure a platform health from historical sensor information indicating the platform health for the component type of the component, wherein the historical sensor information corresponds to the time to failure to meet the desired level of performance for instances of the component type;
create a set of context profiles and feature coefficients associated with operating conditions that are a context for the set of metrics that measures the platform health;
solve, in the time-varying multi-task machine learning model for survival analysis, an optimization problem that determines a remaining useful life vector of a component in the platform based upon the observation matrix, the feature matrix, and the set of context profiles; and
procure, based upon the remaining useful life vector, resources comprising components for service and repair of the component in the platform.

\* \* \* \* \*